(12) United States Patent
Yin

(10) Patent No.: US 11,416,036 B2
(45) Date of Patent: Aug. 16, 2022

(54) ELECTRONIC DEVICE

(71) Applicant: GUANGDONG OPPO MOBILE TELECOMMUNICATIONS CORP., LTD., Guangdong (CN)

(72) Inventor: Bin Yin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 121 days.

(21) Appl. No.: 17/036,512

(22) Filed: Sep. 29, 2020

(65) Prior Publication Data

US 2021/0181801 A1    Jun. 17, 2021

(30) Foreign Application Priority Data

Dec. 13, 2019    (CN) .......................... 201911282316.3

(51) Int. Cl.
*G06F 1/16*    (2006.01)
(52) U.S. Cl.
CPC .......... *G06F 1/1652* (2013.01); *G06F 1/1656* (2013.01)
(58) Field of Classification Search
CPC .... G06F 1/1624; G06F 1/1652; G06F 1/1656; G06F 1/1675
See application file for complete search history.

(56) References Cited

U.S. PATENT DOCUMENTS

| 7,558,057 B1* | 7/2009 | Naksen ................. G06F 1/1688 361/679.56 |
| 10,747,269 B1* | 8/2020 | Choi ..................... G06F 1/1641 |
| 10,878,728 B2* | 12/2020 | Yoon ..................... G06F 1/1681 |
| 10,938,970 B1* | 3/2021 | Lee ...................... H04M 1/0237 |
| 11,112,826 B2* | 9/2021 | Ko ........................ G06F 1/1686 |
| 11,219,132 B2* | 1/2022 | Song ................... G02F 1/13332 |
| 2007/0146243 A1* | 6/2007 | Ou Yang ............... G06F 1/1601 345/76 |
| 2012/0212433 A1* | 8/2012 | Lee ....................... G06F 1/1643 345/173 |

(Continued)

FOREIGN PATENT DOCUMENTS

| CN | 106302885 A | 1/2017 |
| CN | 206270800 U | 6/2017 |

(Continued)

OTHER PUBLICATIONS

International Search Report for PCT Application PCT/CN2020/122473 dated Jan. 20, 2021. (12 pages).

(Continued)

*Primary Examiner* — Anthony Q Edwards

(74) *Attorney, Agent, or Firm* — Young Basile Hanlon & MacFarlane, P.C.

(57) ABSTRACT

The present disclosure discloses an electronic device. The electronic device includes a housing, a reel and a flexible display screen assembly. The housing includes a first portion and a second portion configured to move relative to each other. The reel is rotatably arranged to the first portion. The flexible display screen assembly has an end connected to the second portion and another end coupled to the reel. The reel is configured to rotate to release the flexible display screen assembly when the first portion and the second portion move away from each other.

18 Claims, 25 Drawing Sheets

(56) References Cited

U.S. PATENT DOCUMENTS

| | | | | |
|---|---|---|---|---|
| 2013/0058063 | A1* | 3/2013 | O'Brien | G06F 1/1624 |
| | | | | 361/807 |
| 2014/0194165 | A1* | 7/2014 | Hwang | G06F 1/1652 |
| | | | | 455/566 |
| 2015/0153777 | A1 | 6/2015 | Liu et al. | |
| 2016/0205791 | A1* | 7/2016 | Kim | G06F 1/1652 |
| | | | | 361/679.01 |
| 2016/0324021 | A1* | 11/2016 | Takayanagi | G06F 1/1652 |
| 2017/0284153 | A1 | 10/2017 | Reiner et al. | |
| 2018/0102072 | A1* | 4/2018 | Lee | G09F 9/301 |
| 2020/0337159 | A1* | 10/2020 | Yang | G06F 1/1624 |

FOREIGN PATENT DOCUMENTS

| | | |
|---|---|---|
| CN | 104680943 B | 7/2017 |
| CN | 107402672 A | 11/2017 |
| CN | 108230937 A | 6/2018 |
| CN | 109151097 A | 1/2019 |
| CN | 208434007 U | 1/2019 |
| CN | 109451113 A | 3/2019 |
| CN | 109533604 A | 3/2019 |
| CN | 109587299 A | 4/2019 |
| CN | 109600469 A | 4/2019 |
| CN | 109819074 A | 5/2019 |
| CN | 109857197 A | 6/2019 |
| CN | 109981850 A | 7/2019 |
| CN | 209167965 U | 7/2019 |
| CN | 110491289 A | 11/2019 |
| EP | 3576385 A1 | 12/2019 |
| KR | 20190062855 A | 6/2019 |
| WO | 2019146865 A1 | 8/2019 |

OTHER PUBLICATIONS

Indian Examination Report for IN Application 202014046958 dated Aug. 17, 2021. (6 pages).
Extended European Search Report for EP Application 20203918.6 dated Apr. 23, 2021. (10 pages).
Chinese First Office Action with English Translation for CN Application 201911282316.3 dated Jan. 19, 2022. (24 pages).

* cited by examiner

ELECTRONIC DEVICE

CROSS-REFERENCE TO RELATED APPLICATION(S)

This application claims priority to and the benefit of Chinese Patent Application No. 201911282316.3, filed on Dec. 13, 2019, the entire disclosure of which is hereby incorporated by reference.

TECHNICAL FIELD

The present disclosure relates to a field of electronic technology, and more particularly to an electronic device.

BACKGROUND

Users use mobile terminals more and more frequently and usage scenes become more diversified. In order to be carried easily, most of portable intelligent mobile terminals have a relatively small screen size, usually less than 7 inches, such that compared to products such as tablets, a display region of the screen is limited, and thus the user's operation experience is poor.

SUMMARY

A first aspect of embodiments of the present disclosure provides an electronic device. The electronic device includes: a housing including a first portion and a second portion configured to move relative to each other; a reel rotatably arranged to the first portion; and a flexible display screen assembly having an end connected to the second portion and another end coupled to the reel. The reel is configured to rotate to release the flexible display screen assembly when the first portion and the second portion move away from each other.

A second aspect of embodiments of the present disclosure provides an electronic device. The electronic device includes: a housing including a first portion and a second portion connected to each other and movable relative to each other; a reel arranged in the first portion; and a flexible display screen assembly having a first end fixed to the second portion and a second end wound on the reel. The electronic device has a narrow screen mode in which a part of the flexible display screen assembly is wound on the reel, and an expanded mode in which the part of the flexible display screen assembly is exposed between the first portion and the second portion.

A third aspect of embodiments of the present disclosure provides an electronic device. The electronic device includes: a housing including a first portion, a second portion, and a third portion, the first portion and the second portion being arranged to both sides of the third portion, respectively, and the first portion and the second portion are configured to move relative to the third portion; a first reel arranged in the first portion and a second reel arranged in the second portion; and a flexible display screen assembly having a first end wound on the first reel and a second end wound on the second reel. At least corresponding one of the first reel and the second reel arranged in at least one of the first portion and the second portion is configured to rotate to release the flexible display screen assembly when the at least one of the first portion and the second portion moves away from the third portion.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The foregoing and/or additional aspects and advantages of the present disclosure will become obvious and easily understood in descriptions of embodiments with reference to the following accompanying drawings.

DETAILED DESCRIPTION

Figure 1:
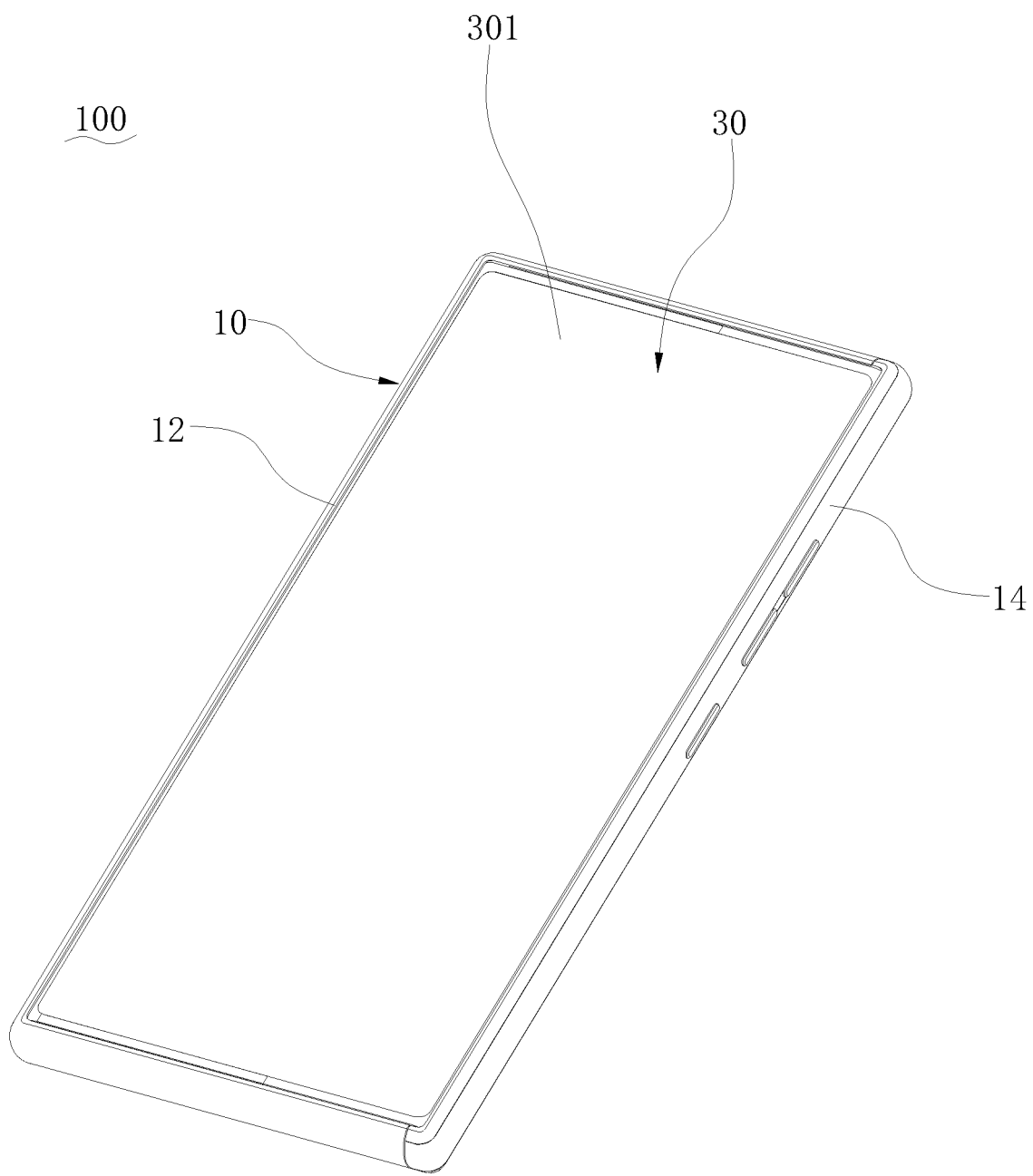
FIG. 1 is a schematic view of an electronic device according to an embodiment of the present disclosure.

Embodiments of the present disclosure are further described. Examples of the embodiments are illustrated in the accompanying drawings. The same or similar elements and the elements having same or similar functions are denoted by like reference numerals throughout the descriptions.

The embodiments described below with reference to the accompanying drawings are examples, are intended to be used to explain the present disclosure, and cannot be construed as limitation to the present disclosure.

Various embodiments and examples are provided in the following description to implement different structures of the present disclosure. In order to simplify the present disclosure, certain elements and arrangements will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or arrangements.

Figure 2:
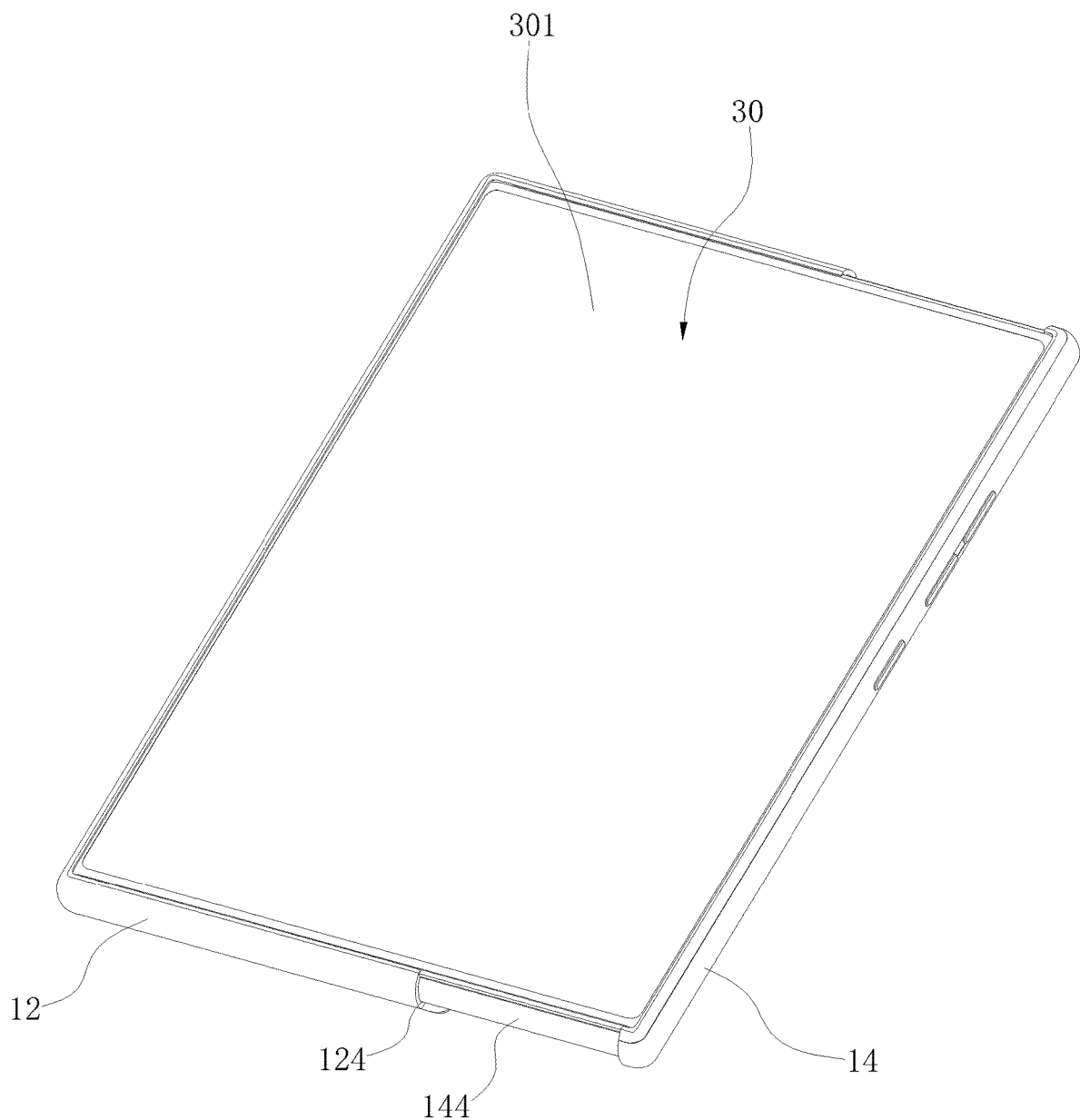
FIG. 2 is another schematic view of an electronic device according to an embodiment of the present disclosure.
Figure 3:
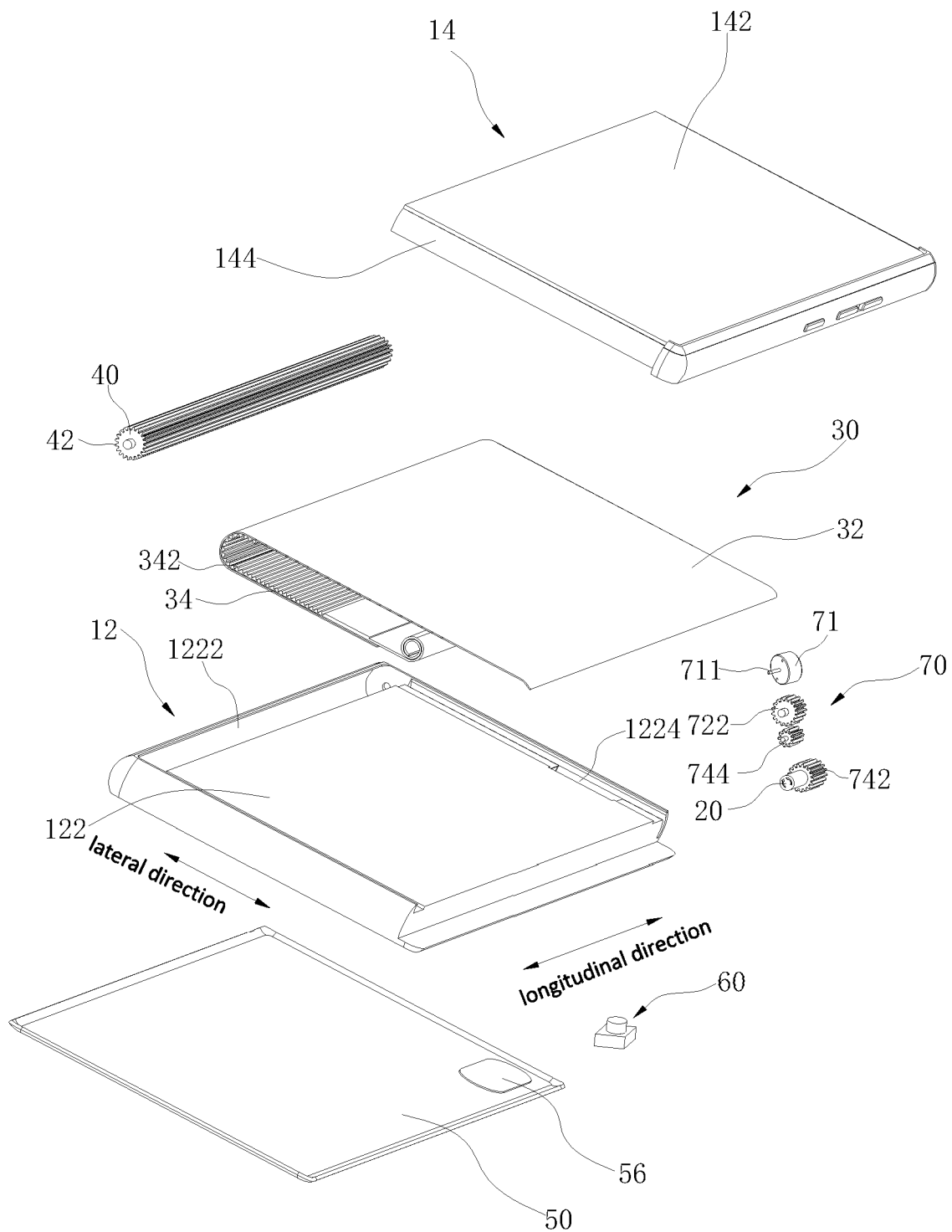
FIG. 3 is an exploded perspective view of an electronic device according to an embodiment of the present disclosure.

As illustrated in FIGS. 1 to 3, an electronic device 100 according to an embodiment of the present disclosure includes a housing 10, a reel 20, a flexible display screen assembly 30, a limiting member 40, a cover body 50, a camera 60, a mainboard 101, and a driving mechanism 70. The reel 20, the flexible display screen assembly 30, the limiting member 40, the cover body 50, the camera 60, the mainboard 101, and the driving mechanism 70 may be arranged in the housing 10. It may be understood that the electronic device 100 according to the embodiment of the present disclosure includes, but is not limited to, mobile terminals such as a mobile phone and a tablet or other portable electronic devices. Herein, the electronic device 100 is illustrated by taking the mobile phone as an example.

As illustrated in FIGS. 4 to 7, in this embodiment, the housing 10 includes a first portion 12 and a second portion 14 configured to move relative to each other. In this embodiment, the first portion 12 and the second portion 14 are slidably connected. In other words, the second portion 14 can slide relative to the first portion 12.

Figure 4:
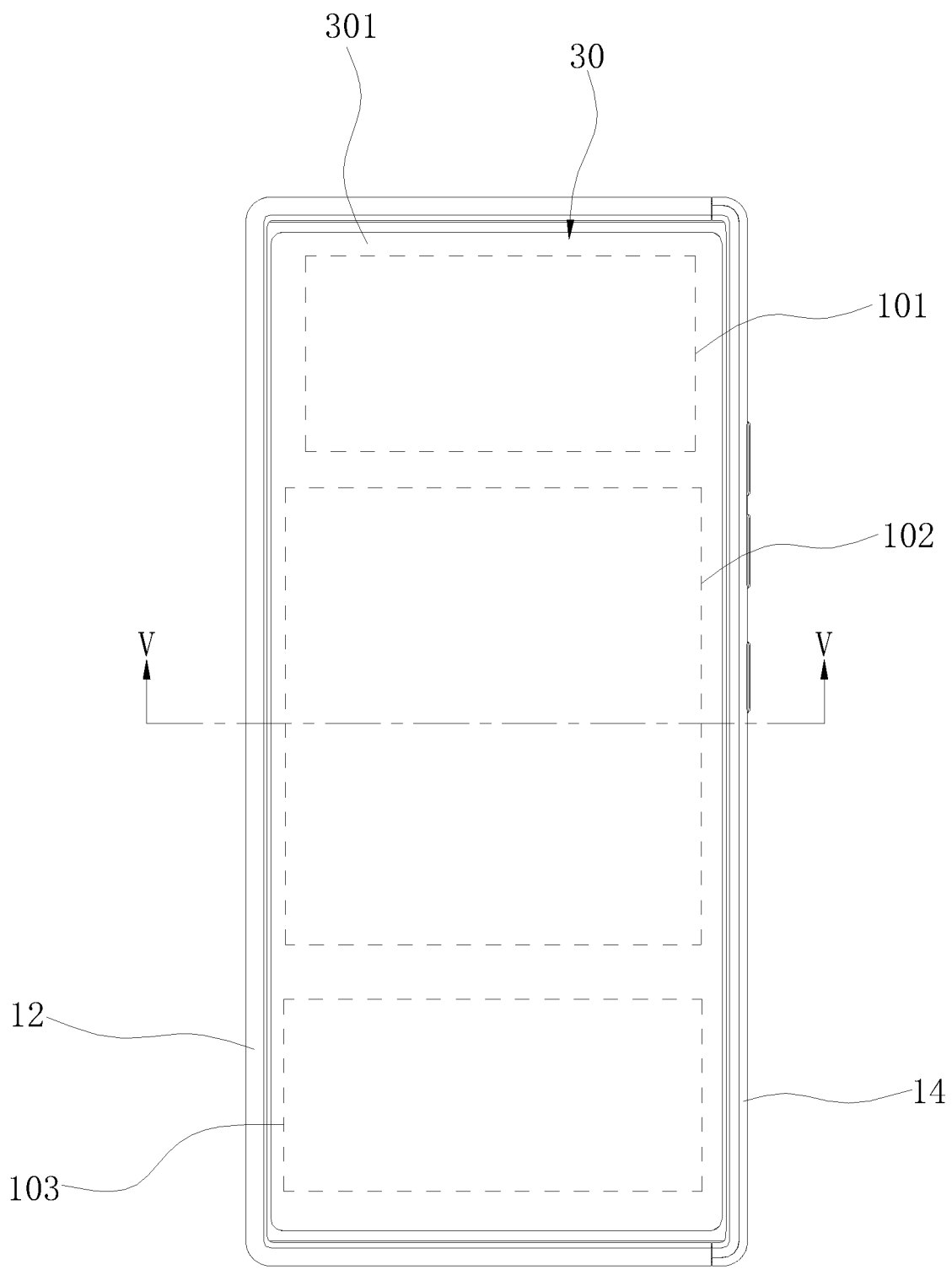
FIG. 4 is a plane view of an electronic device according to an embodiment of the present disclosure.
Figure 5:
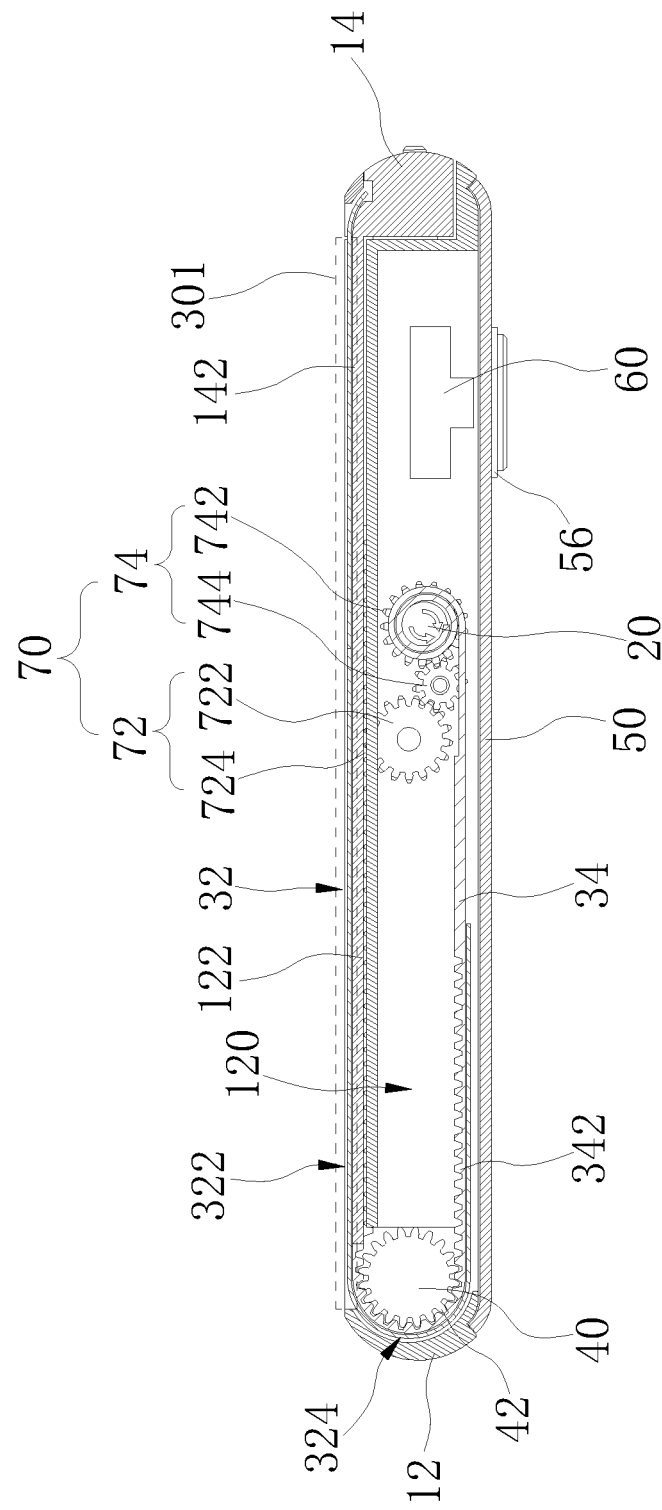
FIG. 5 is a sectional view of the electronic device along line V-V in FIG. 4.
Figure 6:
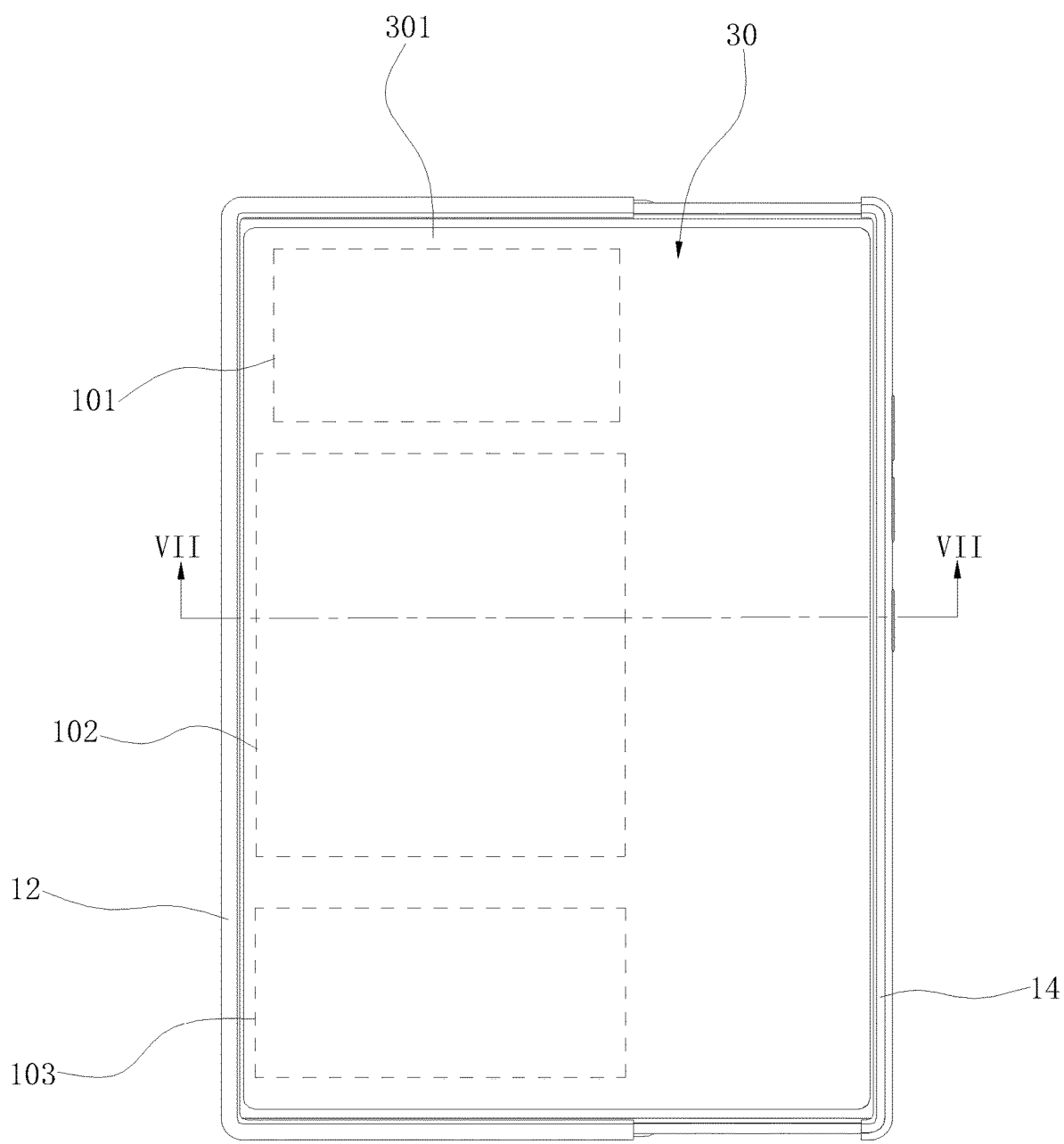
FIG. 6 is another plane view of an electronic device according to an embodiment of the present disclosure.

As illustrated in FIGS. 3 to 7, in an embodiment, the first portion 12 may have a substantially rectangular shape, and defines an accommodating chamber 120. The accommodating chamber 120 may be configured to accommodate components such as the reel 20, the limiting member 40, the camera 60, the mainboard 101 and the driving mechanism 70. Certainly, as illustrated in FIGS. 4 and 6, other electrical components of the electronic device 100, such as a battery 102 and a sub board 103 may be stacked and arranged in the accommodating chamber 120, and electrical components of the electronic device 100 such as a speaker and a microphone may be arranged to the sub board 103.

In order to achieve the lightness and thinness, the space for stacking the electrical components in the electronic device 100 is quite limited. In the embodiments of the present disclosure, the reel 20 is arranged in the first portion 12 to store the flexible display screen assembly 30, thus taking up little space and providing a large space for a stacked design of other electrical components.

Figure 8:
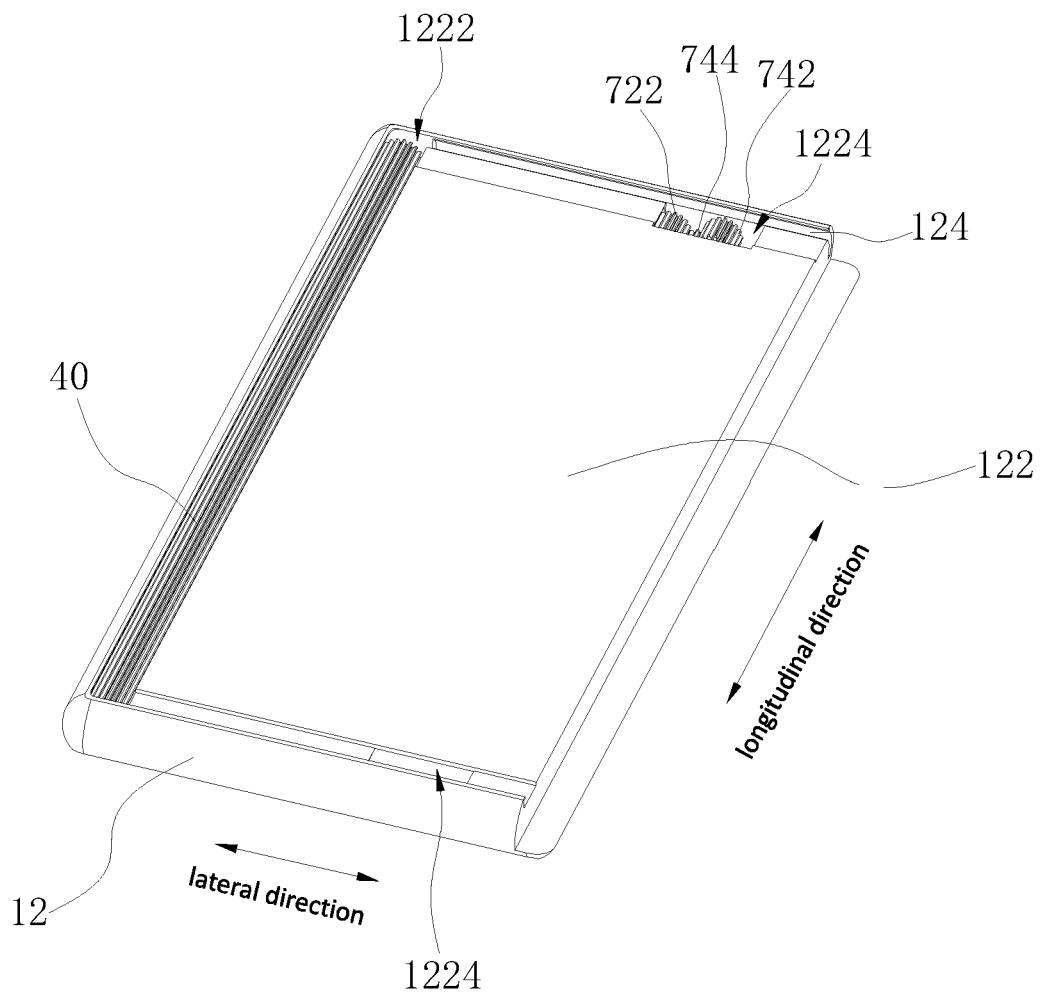
FIG. 8 is a partial schematic view of an electronic device according to an embodiment of the present disclosure.
Figure 9:
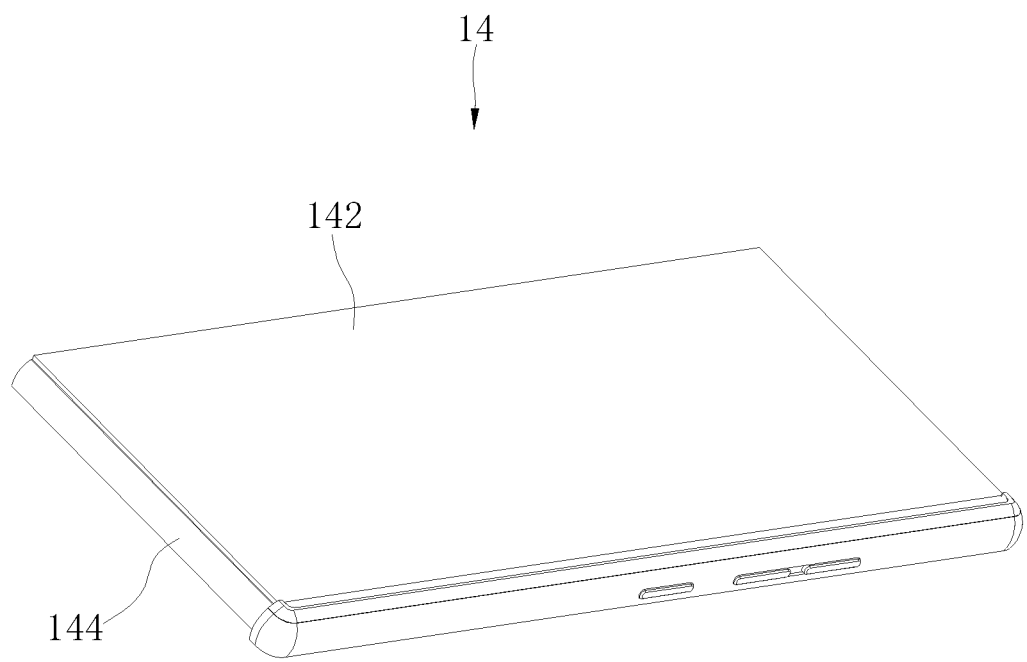
FIG. 9 is a schematic view of a second portion of a housing of an electronic device according to an embodiment of the present disclosure.

As illustrated in FIG. 3 and FIG. 8, the first portion 12 includes a first top plate 122 provided with a first opening 1222 and a second opening 1224, and the first opening 1222 and the second opening 1224 are communicated with the accommodating chamber 120. The direction of the first opening 1222 is perpendicular to the direction of the second opening 1224. An end of the flexible display screen assembly 30 passes through the first opening 1222 such that the end of the flexible display screen assembly 30 is connected with the reel 20, and the driving mechanism 70 is exposed out of the accommodating chamber 120 through the second opening 1224 to be connected with the second portion 14.

As illustrated in FIGS. 3 and 8, in this embodiment, the first opening 1222 may be defined along a longitudinal direction of the electronic device 100, and the second opening 1224 may be defined along a lateral direction of the electronic device 100. Two second openings 1224 may be provided, and the two second openings 1224 are located on two sides of the first top plate 122 and are symmetrically arranged along the longitudinal direction.

The second portion 14 may move relative to the first portion 12 in the lateral direction of the electronic device 100. In addition, the first portion 12 is provided with a sliding groove 124, and the sliding groove 124 is configured to be fitted with the second portion 14 such that the second portion 14 can slide relative to the first portion 12.

In the specification of the present disclosure, it is to be understood that, terms such as "central," "longitudinal," "lateral," "length," "width," "thickness," "upper," "lower," "vertical," "horizontal," "top," "bottom," "inner," and "outer," indicate the orientation or position relationship based on the orientation or position relationship illustrated in the drawings only for convenience of description or for simplifying description of the present disclosure, and do not alone indicate or imply that the device or element referred to must have a particular orientation or be constructed and operated in a specific orientation, and hence cannot be construed as limitation to the present disclosure. In addition, the feature defined with "first" and "second" may comprise one or more of this feature. In the description of the present disclosure, the term "a plurality of" means at least two, such as two, three and so on, unless specified otherwise.

Figure 7:
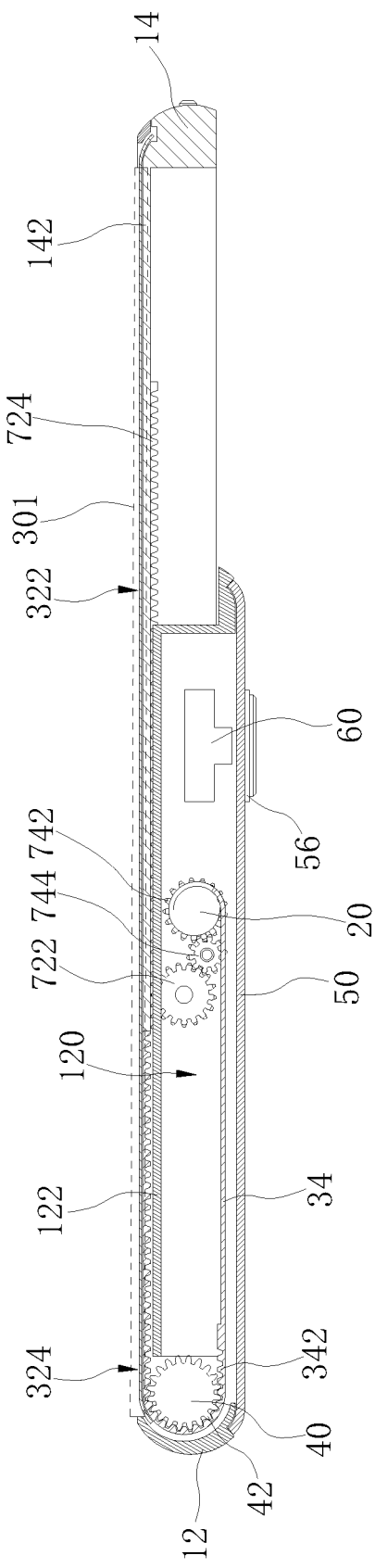
FIG. 7 is a sectional view of the electronic device along line VII-VII in FIG. 6.

As illustrated in FIG. 3, FIG. 5 and FIG. 7, the second portion 14 is arranged on the first portion 12, and the second portion 14 may also have a substantially rectangular shape. The second portion 14 includes a sliding part 144 and a second top plate 142. Two sliding parts 144 are provided, connected to two longitudinal sides of the second top plate 142, respectively, and are substantially symmetrically arranged. The sliding part 144 is configured to be fitted with the sliding groove 124 of the first portion 12 to achieve a sliding connection between the first portion 12 and the second portion 14, and the second top plate 142 is attached to the first top plate 122. It should be noted that, herein, "attach" may be understood as a meaning that two are in contact with each other without affecting the sliding therebetween, or may be understood as a meaning that a gap between the two is within a range of an assembly error.

It should be noted that, in the present disclosure, unless otherwise expressly specified and limited, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

It may be understood that, in this embodiment, the second portion 14 may slide relative to the first portion 12 to move away from or close to the first portion 12. In this embodiment, "the first portion 12 and the second portion 14 move away from each other" may be understood as a meaning that, the second portion 14 slides relative to the first portion 12 and a sliding direction thereof faces away from the first portion 12. In addition, in this embodiment, the first portion 12 and the second portion 14 may also move towards each other, and "the two move towards each other" may be understood as a meaning that the second portion 14 slides relative to the first portion 12 and a sliding direction thereof faces towards the first portion 12.

It should also be noted that, in the description of the present disclosure, unless specified or limited otherwise, the terms "mounted," "coupled", "connected," are used broadly. The terms may indicate, for example, fixed connections, detachable connections, or integral connections, may also indicate mechanical or direct connections or indirect connections via intermediate mediums, and may also indicate inner communications of two elements or the interaction between two elements. The specific meanings of the terms in embodiments of the present disclosure may be understood by those skilled in the art according to particular circumstances.

As illustrated in FIG. 1, FIG. 4 and FIG. 5, in this disclosure, when the first portion 12 and the second portion 14 move towards each other to a limit position (i.e. when the first portion 12 and the second portion 14 move close to each other until the first portion 12 and the second portion 14 are fitted together), the first portion 12 and the second portion 14 together form a housing 10 which has a substantially rectangular shape. As illustrated in FIGS. 2, 6 and 7, when the first portion 12 and the second portion 14 move away from each other (i.e. the two move away from each other), the second portion 14 moves away from the first portion 12.

As illustrated in FIGS. 3, 5 and 7, the reel 20 is rotatably arranged in the first portion 12. In this embodiment, the reel 20 is rotatably arranged in the accommodating chamber 120. In other words, the reel 20 is mounted in the first portion 12 and can rotate relative to the first portion 12. The reel 20 is connected with the driving mechanism 70 such that the reel 20 can rotate relative to the first portion 12 driven by the driving mechanism 70, so as to release or wind the flexible display screen assembly 30.

It may be understood that the reel 20 being rotatably arranged in the first portion 12 may refer to that the reel 20 is directly mounted in the first portion 12, or that the reel 20 is mounted in the first portion 12 via other media.

In addition, as further illustrated in FIGS. 5 and 7, one end of the flexible display screen assembly 30 is connected to the second portion 14. In this embodiment, this end is fixedly connected with the second portion 14. In other embodiments, this end may also be connected to the second portion 14 via a movable mechanism. For example, the above movable mechanism may be a structure for adjusting the tightness of the flexible display screen assembly 30. The other end of the flexible display screen assembly 30 is coupled to the reel 20, such that a part of the flexible display screen assembly 30 may be wound on the reel 20. The reel 20 may be configured to wind and release the flexible display screen assembly 30. When the first portion 12 and the second portion 14 move away from each other, the reel 20 rotates to release the flexible display screen assembly 30, thereby expanding a display portion 301 of the flexible display screen assembly 30. In this embodiment, the one end of the flexible display screen assembly 30 is fixedly connected with the second portion 14, and the other end thereof passes through the first opening 1222 of the first portion 12 and then is connected with the reel 20 arranged in the accommodating chamber 120.

In this way, when the first portion 12 and the second portion 14 move away from each other, the reel 20 may rotate to release the flexible display screen assembly 30, thereby expanding the display portion 301 of the flexible display screen assembly 30. In this way, a size of a screen display region of the electronic device 100 may be adjusted freely. When a large screen is not needed, the display portion 301 may not be expanded, such that an overall size of the electronic device 100 is small and thus the electronic device 100 easy to carry. When the large screen is needed, the display portion 301 of the flexible display screen assembly 30 can be expanded to improve user's operation experiences.

It may be understood that, as illustrated in FIG. 5, in a case that the first portion 12 and the second portion 14 are adjacent to each other and connected together, the display portion 301 of the flexible display screen assembly 30 is not expanded, a part of the display portion 301 not expanded is received in the accommodating chamber 120, and the electronic device 100 is in a narrow screen mode. In this case, a part of the flexible display screen assembly 30 is wound on the reel 20, and another part of the flexible display screen assembly 30 is located above the first top plate 122 (or the second top plate 142, because the second top plate 142 substantially overlaps the first top plate 122) and is exposed from the housing 10 for display. It should be noted that, in this embodiment, "the display portion 301 of the flexible display screen assembly 30" may be understood as the part located above the first top plate 122 of the first portion 12 and/or the second top plate 142 of the second portion 14, that is, the part exposed from the housing 10.

As illustrated in FIG. 7, when the display portion 301 of the flexible display screen assembly 30 needs to be expanded, the first portion 12 and the second portion 14 move away from each other. Thus, the second portion 14 drives the flexible display screen assembly 30 to stretch. In this way, the reel 20 may release the flexible display screen assembly 30, such that the display portion 301 of the flexible display screen assembly 30 is enlarged, thereby further improving the user's operation experiences and demands. In this case, the electronic device 100 is in an expanded mode.

It may be understood that, when the second portion 14 and the first portion 12 move away from each other, there is another limit position. When at this limit position, the display region of the electronic device 100 is the largest, i.e., the region of the flexible display screen assembly 30 exposed from the housing 10 is the largest. That is, the display portion 301 of the flexible display screen assembly 30 has the largest area (as illustrated in FIG. 7). When the first portion 12 and the second portion 14 are adjacent to each other and connected together, the display region of the electronic device 100 is the smallest, i.e., the display portion 301 of the flexible display screen assembly 30 is the smallest. That is, the display portion 301 of the flexible display screen assembly 30 has the smallest area (as illustrated in FIG. 5).

In this embodiment, the one end of the flexible display screen assembly 30 is fixedly connected to the second portion 14, which may refer to that the one end of the flexible display screen assembly 30 is directly fixed to the second portion 14, or the one end of the flexible display screen assembly 30 is fixed to the second portion 14 via other media. The one end of the flexible display screen assembly 30 cannot move relative to the second portion 14.

In the embodiment of the present disclosure, the one end of the flexible display screen assembly 30 refers to a first edge of the flexible display screen assembly 30, the other end of the flexible display screen assembly 30 refers to a second edge of the flexible display screen assembly 30, and the second edge is opposite to the first edge.

As illustrated in FIG. 3, FIG. 5 and FIG. 7, the flexible display screen assembly 30 includes a flexible display screen 32 and a flexible support 34, and the flexible display screen 32 and the flexible support 34 are stacked and fixedly connected.

As illustrated in FIG. 5, the flexible display screen 32 includes a first region 322 and a second region 324 connected to the first region 322. The first region 322 is attached to the second top plate 142, and corresponds to the second top plate 142, i.e. overlapping the second top plate 142. The first region 322 may be fixedly connected with the second top plate 142 through an optically clear adhesive (OCA). The second region 324 is at least partially located in the accommodating chamber 120 of the first portion 12 and is attached to the flexible support 34.

The flexible support 34 is arranged to a bottom of the second region 324 and completely covers the second region 324. The flexible support 34 may also be fixedly connected with the second region 324 through the optically clear adhesive (OCA). In the example illustrated in FIGS. 5 and 7, the flexible support 34 completely covers and exceeds beyond the second region 324, and the exceeding portion of the flexible support 34 is connected with the reel 20. That is, the exceeding portion is wound on the reel 20. As illustrated in FIG. 5, when the electronic device 100 is in the narrow screen mode, the flexible support 34 is wound on the reel 20, and the flexible display screen 32 has a rough "U" shape. In this way, a support area of the flexible support 34 is relatively large, so as to reduce the deformation of the flexible display screen 32 due to being pressed.

In this way, when the electronic device 100 is in the narrow screen mode (i.e., when the first portion 12 and the second portion 14 move towards each other to the limit position), only the flexible support 34 is wound by the reel 20, and the flexible display screen 32 will not be directly wound by the reel 20. Thus, the bent degree and the bent times of the flexible display screen 32 can be reduced, so as to improve the service life of the flexible display screen 32. Certainly, it may be understood that, in other embodiments, both the flexible display screen 32 and the flexible support 34 may be connected with the reel 20 after the flexible display screen 32 completely overlaps the flexible support 34, such that the reel 20 can wind and release both the flexible support 34 and the flexible display screen 32 simultaneously, and the specific arrangement is not limited herein. In addition, the flexible support 34 completely covers the second region 324, and the support area of the flexible support 34 is relatively large, so as to reduce the deformation of the flexible display screen 32 due to being pressed.

In addition, in this embodiment, the flexible display screen 32 has the rough "U" shape, such that the electrical components of the electronic device 100 such as the mainboard 101, the battery 102, the sub board 103, and a sensor may be stored in the space enclosed by the flexible display screen assembly 30. In this way, the arrangement of the flexible display screen assembly 30 will not affect the placement of the electrical components such as the mainboard 101 and the battery 102, thus effectively improving the space utilization, and facilitating the stacking and the placement of the electrical components such as the mainboard 101 and the battery 102.

As illustrated in FIG. 5 and FIG. 7, in this embodiment, when the first portion 12 and the second portion 14 move away from each other, the flexible support 34 abuts against the first portion 12 to keep the display portion 301 of the flexible display screen 32 flat.

When the first portion 12 and the second portion 14 move away from each other, the flexible support 34 is opposite to and attached to the first top plate 122. The flexible support 34 is located between the flexible display screen 32 and the first top plate 122 and fills a gap between the flexible display screen 32 and the first top plate 122. In other words, a thickness of the flexible support 34 is equal to a distance between an upper surface of the first portion 12 and an upper surface of the second portion 14.

It may be understood that, as illustrated in FIG. 7, when the first portion 12 and the second portion 14 move away from each other, there is a height difference between the upper surface of the first top plate 122 and the upper surface of the second top plate 142, and the flexible display screen 32 is fixedly connected to the upper surface of the second top plate 142. Moreover, the flexible support 34 abuts against the first top plate 122 of the first portion 12, that is, the flexible support 34 fills the gap between the flexible display screen 32 and the first top plate 122. In other words, since the first top plate 122 is attached to the second top plate 142, and the flexible display screen 32 is fixedly connected to the upper surface of the second top plate 142, the thickness of the flexible support 34 is equal to a thickness of the second top plate 142, so as to fill the height difference between the first top plate 122 and the second top plate 142, i.e. filling the gap between the flexible display screen 32 and the first top plate 122, such that the flexible display screen 32 can be kept flat when moving. Thus, when the electronic device 100 is in the expanded mode, the flexible display screen 32 can be prevented from collapsing under being touched and pressed, thereby improving the user's operation experiences.

In addition, as further illustrated in FIGS. 3, 5 and 7, a first tooth part 342 is provided to a bottom of the flexible support 34 and is configured to mesh with the limiting member 40 such that the limiting member 40 can support the flexible display screen assembly 30 and keep the flexible display screen assembly 30 to move smoothly.

In addition, in this embodiment, the flexible support 34 may be made of a magnetic material, the first top plate 122 may be made of a magnetizable metal material, or the first top plate 122 may include a magnetizable metal layer coated on its surface. In this way, when the second portion 14 moves away from the first portion 12 to expand the display portion 301 of the flexible display screen assembly 30, the flexible support 34 can be absorbed to the first top plate 122, thus preventing the dislocation or the play of the flexible display screen assembly 30 during operation.

As illustrated in FIGS. 5, 7 and 8, the limiting member 40 is rotatably arranged in the accommodating chamber 120 of the first portion 12 and is exposed from the first opening 1222, a middle portion of the flexible display screen assembly 30 is wound around the limiting member 40, and the limiting member 40 is configured to limit a form of the flexible display screen assembly 30.

In this embodiment, the limiting member 40 has a cylindrical shape, and a second tooth part 42 is provided on a circumferential surface of the limiting member 40 and is configured to mesh with the first tooth part 342 of the flexible support 34 so as to support the flexible display screen assembly 30 and to guide the expansion of the flexible display screen assembly 30. It may be understood that the middle portion of the flexible display screen assembly 30 may be interpreted as a portion located between the two ends of the flexible display screen assembly 30.

As such, the limiting member 40 is able to limit the form of the flexible display screen assembly 30 such that the display portion 301 of the flexible display screen assembly 30 may be in a flat state. That is, the flexible display screen assembly 30 may be kept in a "U"-shape state. In addition, the limiting member 40 is meshed with the flexible support 34 to support the flexible display screen assembly 30, and also to guide the flexible display screen assembly 30 when the second portion 14 drives the flexible display screen assembly 30 to move, so as to keep the stable movement of the flexible display screen assembly 30.

In this embodiment, the limiting member 40 is a guide gear, the limiting member 40 is arranged at a position corresponding to the first opening 1222, the middle portion of the flexible display screen assembly 30 is wound around the limiting member 40, and the first tooth part 342 of the flexible support 34 is meshed with the second tooth part 42. In other words, the one end of the flexible display screen assembly 30 is fixedly connected with the second portion 14, and the other end thereof passes through the first opening 1222 and is connected with the reel 20 after being wound around the limiting member 40. When the second portion 14 drives the one end of the flexible display screen 32 to move, the limiting member 40 rotates gradually under the drive of the flexible support 34, and the reel 20 gradually releases the other end of the flexible display screen assembly 30, i.e. an end of the flexible support 34.

It may be understood that, in other embodiments, the limiting member 40 may be not provided with the second tooth part 42, but directly be a smooth shaft or a roller. The flexible support 34 may also be not provided with the first tooth part 342, the limiting member 40 and the flexible support 34 may be rollably connected directly, and the flexible display screen assembly 30 is directly wound around the smooth shaft or the roller, such that the limiting member 40 can also support and guide the flexible display screen 32.

Figure 10:
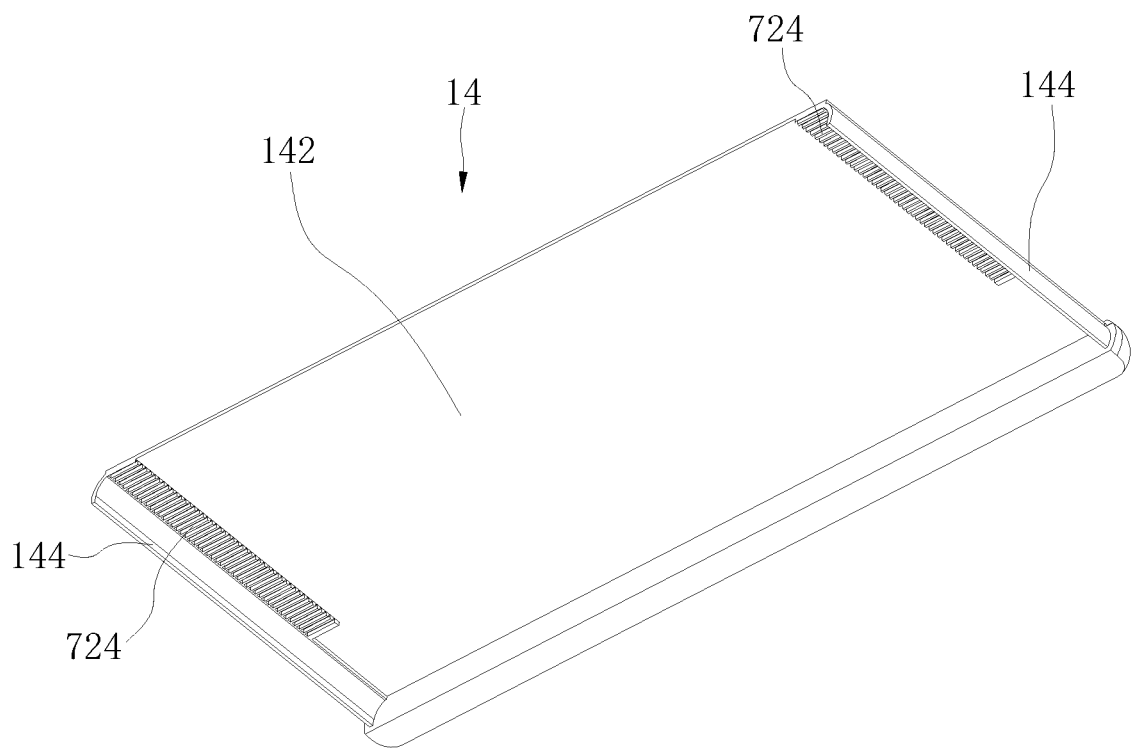
FIG. 10 is another schematic view of a second portion of a housing of an electronic device according to an embodiment of the present disclosure.

As illustrated in FIGS. 5, 7 and 10, in this embodiment, the camera 60 may be arranged in the accommodating chamber 120 of the first portion 12, the cover body 50 is connected with the first portion 12 and covers the accommodating chamber 120, and the camera 60 is able to acquire images through the cover body 50. In other words, in this embodiment, the first portion 12 and the cover body 50 are formed as a whole. When the second portion 14 moves relative to the first portion 12, the camera 60 will not move together. When in the expanded mode, the camera 60 is located in the middle of the whole flexible display screen 32.

In this embodiment, the cover body 50 is detachably connected with the first portion 12, such that it is convenient to detach the cover body 50 to repair and replace the electrical components such as the mainboard 101, the battery 102 or the sensor stacked in the accommodating chamber 120. It may be understood that, in other embodiments, the cover body 50 and the first portion 12 may be configured as an integral structure, i.e. being formed integrally, and the specific arrangement is not limited herein.

Figure 11:
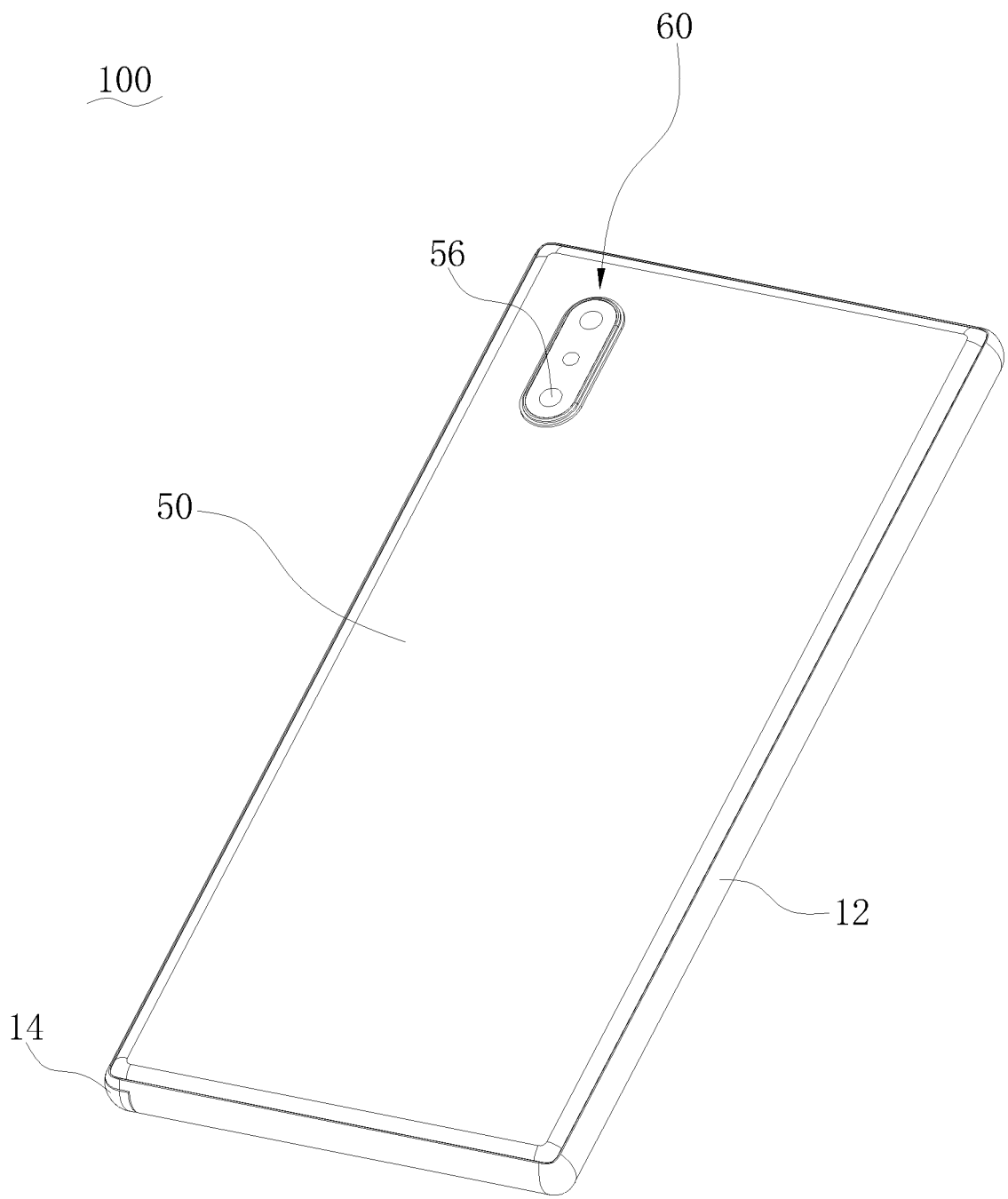
FIG. 11 is yet another schematic view of an electronic device according to an embodiment of the present disclosure.
Figure 12:
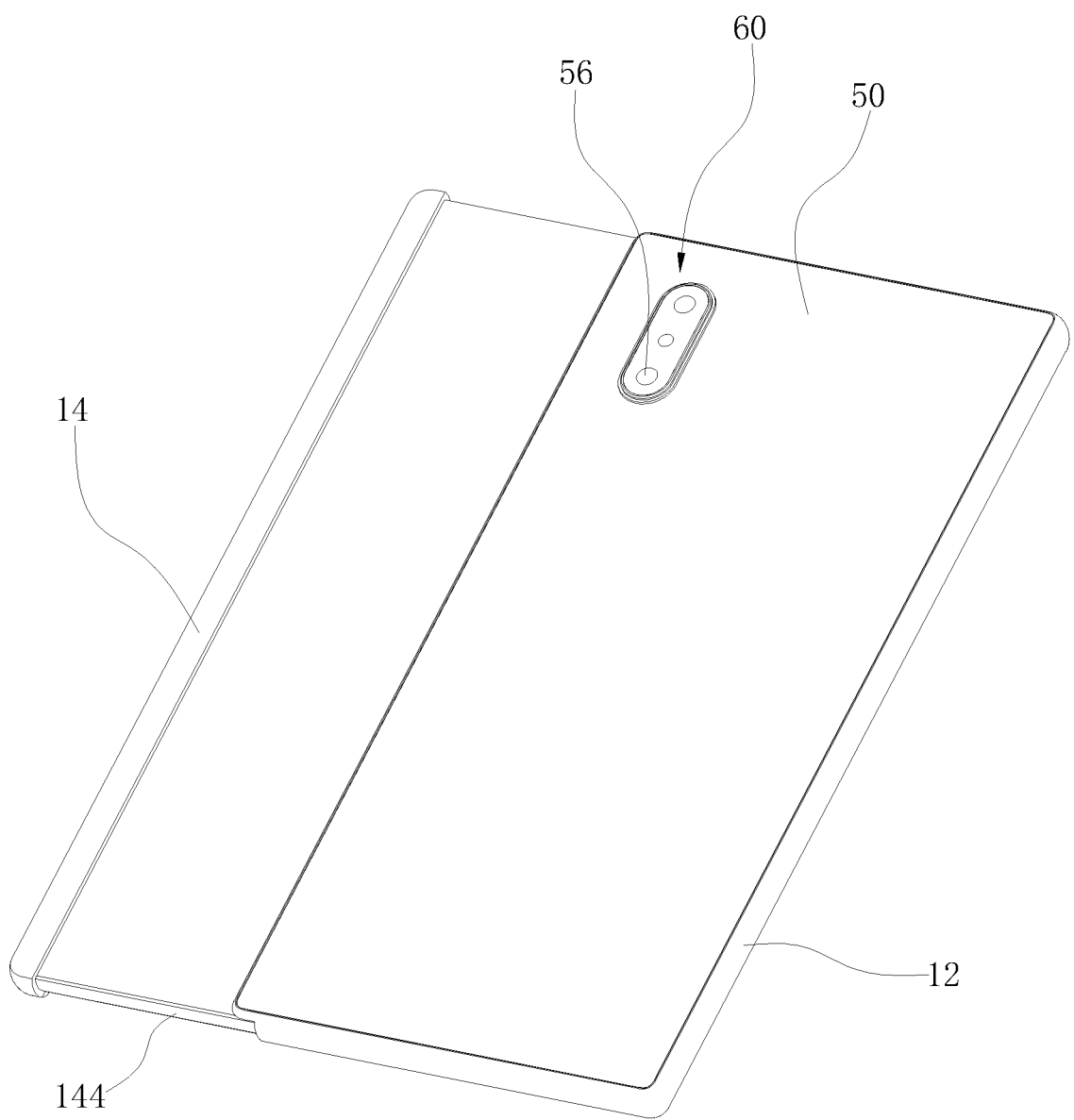
FIG. 12 is further another schematic view of an electronic device according to an embodiment of the present disclosure.

In addition, as illustrated in FIG. 11 and FIG. 12, the cover body 50 includes a light transmitting part 56 corresponding to the camera 60 in terms of position (i.e. the light transmitting part 56 is aligned with the camera 60), and light may be received by the camera 60 through the light transmitting part 56, such that the camera 60 can acquire images through the cover body 50 for shooting an outside. In this way, the light transmitting part 56 may protect the camera 60 without affecting the shooting effect of the camera 60, so as to prevent the camera 60 from being scratched accidentally due to being directly exposed out of the housing 10. In this case, the camera 60 may be a rear camera of the mobile phone, and the rear camera can acquire an image through the light transmitting part 56 of the cover body 50. It may be understood that, in some embodiments, the camera 60 may also be a front camera of the mobile phone. In this case, the camera 60 may acquire images through a hole formed in the flexible display screen assembly 30 or the housing 10. Or, an ejection or slide mechanism may be adopted. When the front camera needs to be used, the camera 60 may be ejected or slid out of the housing 10 by the ejection or slide mechanism, thereby increasing a screen-to-body ratio of the electronic device 100.

Figure 13:
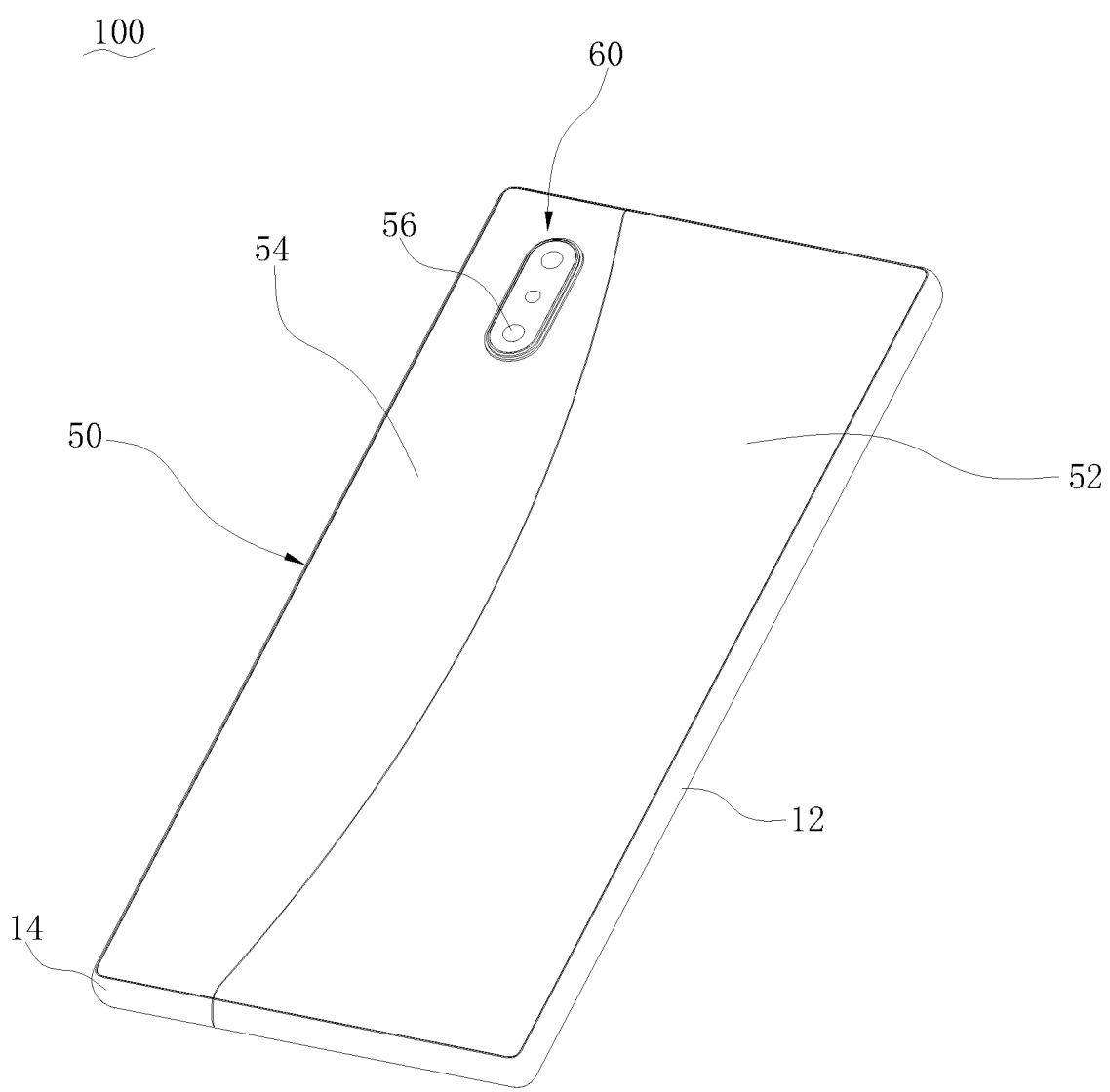
FIG. 13 is further another schematic view of an electronic device according to an embodiment of the present disclosure.
Figure 14:
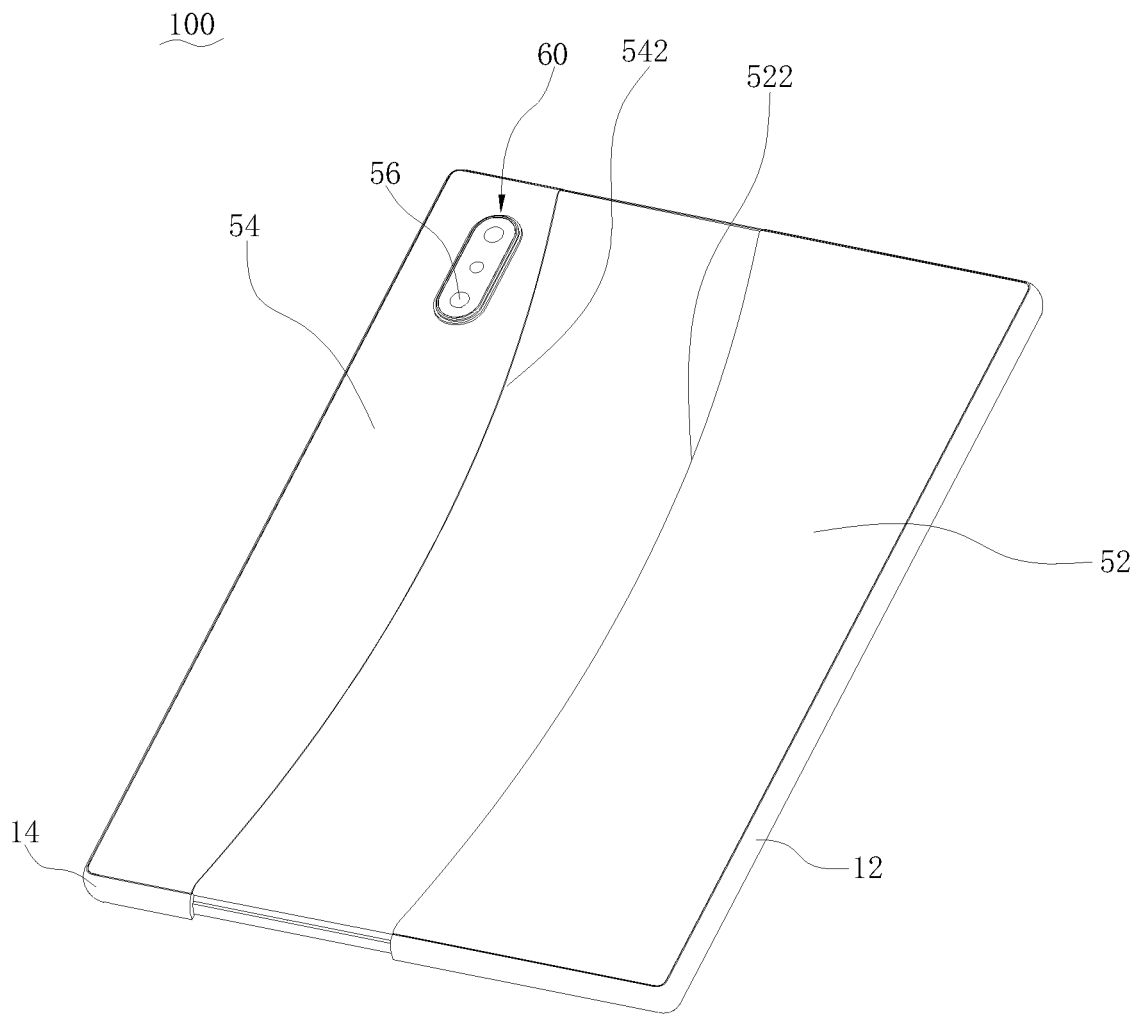
FIG. 14 is further another schematic view of an electronic device according to an embodiment of the present disclosure.

It may be understood that, as illustrated in FIGS. 13 and 14, in other embodiments, the camera 60 may also be fixedly connected to the second portion 14 and acquire images through the second portion 14. In this embodiment, the second portion 14 defines a storage chamber 140 in which the camera 60 is arranged. The light may pass through the second portion 14 to be received by the camera 60, such that the camera 60 may acquire images through the second portion 14. When the second portion 14 moves relative to the first portion 12, the camera 60 also moves with the second portion 14. In this way, the size of the display region 301 of the flexible display screen assembly 30 can be adjusted without affecting the shooting and photographing functions of the camera 60, such that the user can shoot conveniently in any case.

Figure 15:
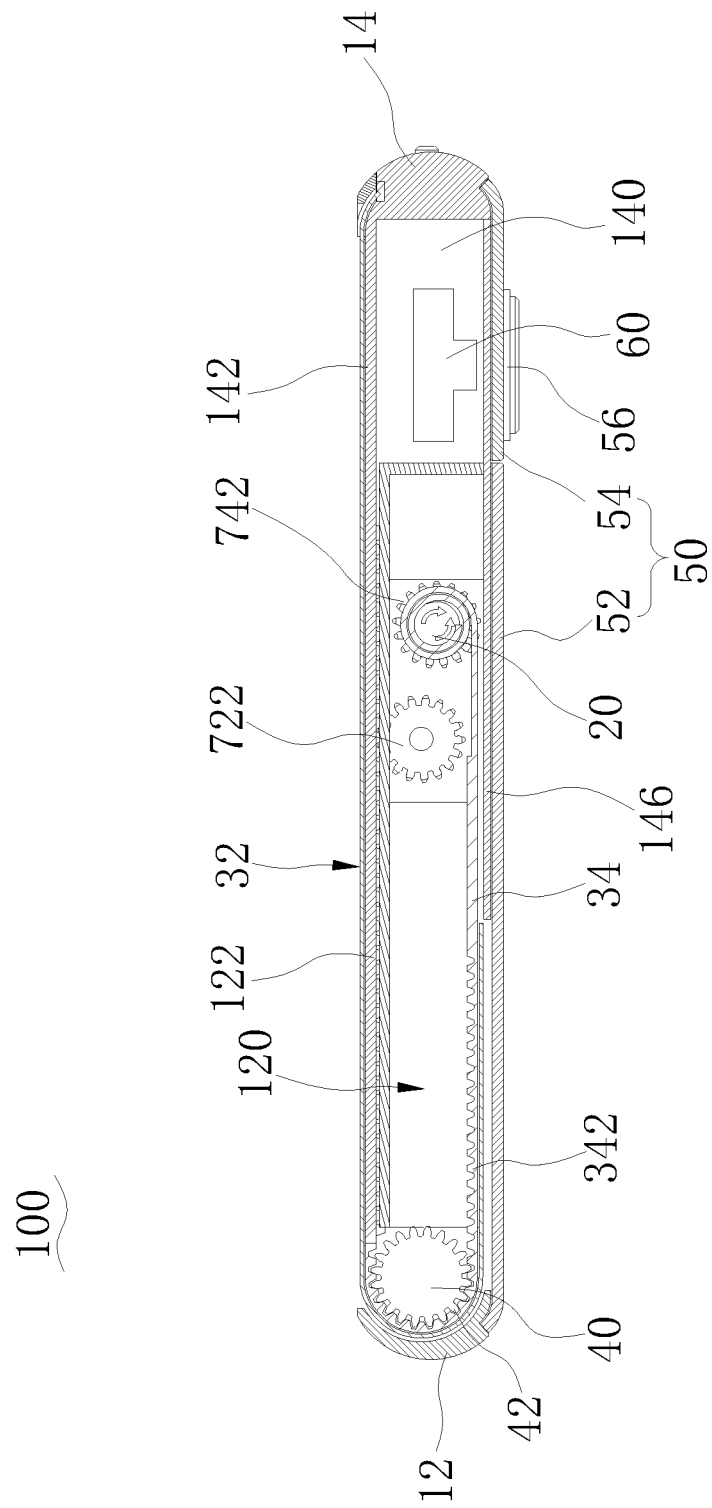
FIG. 15 is another sectional view of an electronic device according to an embodiment of the present disclosure.

As illustrated in FIG. 15, in this embodiment, the second portion 14 also includes a bottom plate 146, and the bottom plate 146 is arranged opposite to the second top plate 142 to define the storage chamber 140. In other words, the camera 60 may be arranged in the storage chamber 140 between the second top plate 142 and the bottom plate 146, and the camera 60 may acquire images through the bottom plate 146 of the second portion 14. Certainly, it may be understood that, as long as the normal shooting and photographing functions of the camera 60 can be achieved, the camera 60 may be only partially located in the storage chamber 140, and the specific arrangement is not limited herein.

Further, in this embodiment, in order to enable the camera 60 to normally shoot and photograph, the bottom plate 146 has a through hole corresponding to the camera 60 or includes a light transmitting region corresponding to the camera 60. The camera 60 is exposed from the through hole or acquires images through the light transmitting region. That is, the light may pass through the through hole or the light transmitting region to be received by the camera 60. The light transmitting region may be made of a light transmitting material such as glass.

Figure 16:
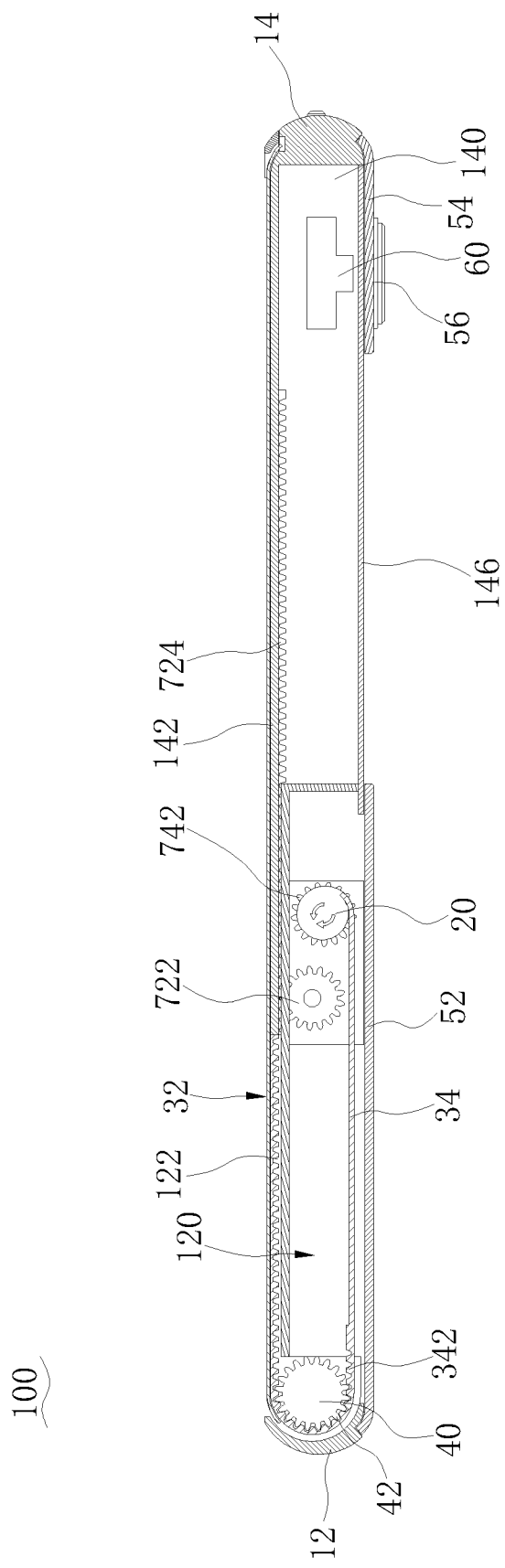
FIG. 16 is yet another sectional view of an electronic device according to an embodiment of the present disclosure.

In addition, as illustrated in FIGS. 15 and 16, in this embodiment, the cover body 50 includes a first connecting part 52 and a second connecting part 54, and the first connecting part 52 is fixedly connected to the bottom of the first portion 12 and encloses the accommodating chamber 120. The second connecting part 54 is fixedly connected to the bottom of the second portion 14, and the camera 60 may acquire images through the second connecting part 54. In other words, the first connecting part 52 is fixedly connected with the first portion 12, the second connecting part 54 is fixedly connected with the second portion 14, the second connecting part 54 can move relative to the first connecting part 52, and the camera 60 can move with the second portion 14.

In this embodiment, the second connecting part 54 may be fixedly or detachably connected to the bottom plate 146. The second connecting part 54 includes a light transmitting part 56 corresponding to the through hole or the light transmitting region. In other words, the camera 60, the through hole (or the light transmitting region) and the light transmitting part 56 are corresponding to one another. In this way, the camera 60 can receive the light through the through hole (or the light transmitting region) and the light transmitting part 56 to acquire images.

As illustrated in FIGS. 13 and 15, when the electronic device 100 is in the narrow screen mode, that is, when the first portion 12 and the second portion 14 move towards each other to the limit position, the first connecting part 52 and the second connecting part 54 are spliced to form the cover body 50 of the electronic device 100 together. As illustrated in FIG. 14 and FIG. 16, when the second portion 14 moves away from the first portion 12, the second connecting part 54 is separated from the second connecting part 52.

As illustrated in FIGS. 13 and 14, in this embodiment, the first connecting part 52 has a concave portion 522 of an arc shape, the second connecting part 54 has a convex portion 542 matching with the concave portion 522, and the convex portion 542 also has an arc shape. When the electronic device 100 is in the narrow screen mode (as illustrated in FIGS. 13 and 15), the concave portion 522 and the convex portion 542 are spliced together to achieve the splicing of the first connecting part 52 and the second connecting part 54. It may be understood that the first connecting part 52 and the second connecting part 54 may also be made into other forms. For example, both have a rectangular shape and may be directly spliced into the cover body 50. For another example, one of the two may be provided with protrusions regularly arranged thereon, and the other one may have grooves corresponding to the protrusions, such that when the electronic device 100 is in the expanded mode, the form of the housing 1 may be enriched to improve the aesthetic perception.

Further, in this embodiment, the first connecting part 52 and the second connecting part 54 may be designed to have two different colors, thus enriching the appearance of the electronic device 100.

As illustrated in FIGS. 3, 5 and 7, in this embodiment, the driving mechanism 70 may be arranged in the accommodating chamber 120 of the first portion 12 and connected with the second portion 14. The driving mechanism 70 is configured to drive the second portion 14 to move away from the first portion 12, so as to drive the flexible display screen assembly 30 to stretch.

In addition, as illustrated in FIGS. 5 and 7, in the embodiment, the driving mechanism 70 may also be connected with the reel 20. When the driving mechanism 70 drives the second portion 14 to move away from the first portion 12, the driving mechanism 70 may also simultaneously drive the reel 20 to rotate to release the flexible display screen assembly 30, thereby expanding the display portion 301 of the flexible display screen assembly 30.

In this embodiment, the driving mechanism 70 may include a motor 71, a first transmission structure 72 and a second transmission structure 74, and the motor 71 may be fixedly arranged in the accommodating chamber 120 of the first portion 12. The first transmission structure 72 is connected with the second portion 14 and the motor 71, the second transmission structure 74 is connected with the first transmission structure 72 and the reel 20, and the motor 71 is configured to drive the second portion 14 to move relative to the first portion 12 through the first transmission structure 72 and to drive the reel 20 to rotate through the first transmission structure 72 and the second transmission structure 74.

The first transmission structure 72 includes a first transmission gear 722 and a rack part 724. The first transmission gear 722 is connected with the second transmission structure 74 and is fixed to a motor shaft 711 of the motor 71, and the rack part 724 is fixedly connected with the second portion 14 and is meshed with the first transmission gear 722. In this way, a gear and rack drive is adopted for driving in this embodiment, which has a simple structure as well as a stable and reliable transmission.

In this embodiment, the rack part 724 is integrally formed with the second top plate 142 of the second portion 14. In other words, the rack part 724 may be directly integrally formed to a lower surface of the second top plate 142. In this way, the rack part 724 may be directly processed on the second top plate 142, which has good integrity and is easy to process. It may be understood that, in other embodiments, the rack part 724 and the second portion 14 may also be formed separately, and then fixedly connected together by welding, etc., and the specific arrangement is not limited herein.

As illustrated in FIGS. 5 and 7 again, the second transmission structure 74 is connected with the reel 20 and the first transmission gear 722. The second transmission structure 74 includes a second transmission gear 742 and a third transmission gear 744, the second transmission gear 742 is fixed on the reel 20 and is concentric with the reel 20, the third transmission gear 744 is rotatably arranged to the first portion 12, and the third transmission gear 744 is connected with the second transmission gear 742 and the first transmission gear 722. That is, the third transmission gear 744 is meshed with the second transmission gear 742 and the first transmission gear 722, respectively, and the first transmission gear 722 and the second transmission gear 742 are located on opposite sides of the third transmission gear 744, respectively.

In this embodiment, the motor 71 is configured to drive the second portion 14 to move relative to the first portion 12 through the first transmission structure 72. Further, the motor 71 is also configured to drive the reel 20 to rotate through the second transmission structure 74 so as to release the flexible display screen assembly 30 while driving the second portion 14 to move away from the first portion 12. In this way, the stretch of the flexible display screen assembly 30 and the synchronous release of the reel 20 allow the movement to be relatively stable, and thus the flexible display screen assembly 30 is not prone to wrinkle.

When the display region of the electronic device 100 needs to expand, that is, the display portion 301 of the flexible display screen assembly 30 needs to expand, the motor 71 drives the first transmission gear 722 to rotate, and the first transmission gear 722 drives the second portion 14 to move away from the first portion 12 through the rack part 724. The second portion 14 drives the flexibly display screen assembly 30 to stretch, that is, the second portion 14 drives the one end of the flexible display screen assembly 30 to move away from the first portion 12. Moreover, the first transmission gear 722 also drives the third transmission gear 744 to rotate synchronously, and the third transmission gear 744 drives the reel 20 to rotate, such that the reel 20 can release the flexible display screen assembly 30 synchronously, so as to expand the display portion 301 of the flexible display screen assembly 30.

When the display portion 301 of the flexible display screen assembly 30 needs to be narrowed, the motor 71 only needs to rotate reversely to drive the second portion 14 to move towards the first portion 12. In such a case, the second portion 14 gradually releases the flexible display screen assembly 30, and the reel 20 can also gradually wind the flexible display screen assembly 30.

It may be understood that, a displacement of a movement of the second portion 14 is equal to a length of the flexible display screen assembly 30 released by the rotation of the reel 20 in a unit time. In other words, a distance moved by the one end of the flexible display screen assembly 30 under the pull of the second portion 14 just is the length of the flexible display screen assembly 30 released by the rotation of the reel 20, so as to ensure that the flexible display screen assembly 30 can move stably without wrinkles.

It may be understood that, in this embodiment, when the first portion 12 and the second portion 14 moves away from each other, the display portion of the flexible display screen assembly 30 can be expanded, and when the first portion 12 and the second portion 14 move towards each other, the expanded display portion of the flexible display screen assembly 30 can be received in the accommodating chamber 120.

In addition, it may be understood that, in some embodiments, in order to ensure that the reel 20 winds and releases the flexible display screen assembly 30 stably, two driving mechanisms 70 and two reels 20 are provided. The two driving mechanisms 70 may be symmetrically arranged in the accommodating chamber 120 along the longitudinal direction of the electronic device 100, connected with the second portion 14, respectively, and also connected with the two reels 20, respectively. In this way, the synchronous and stable rotation of the two reels 20 and the smooth movement of the second portion 14 can be achieved by the synchronous driving of the two same driving mechanisms 70, so as to ensure the reliability of the movement of the electronic device 100 when the electric device 100 expands the display portion 301 of the flexible display screen assembly 30.

Furthermore, in some other embodiments, the driving mechanism 70 may also include two synchronous motors 71 arranged on the first portion 12. One motor 71 is configured to drive the second portion 14 to move relative to the first portion 12, the other motor 71 drives the reel 20 to rotate, and thus the second portion 14 and the reel 20 are driven by separate motors 71. In this way, the synchronous movement of the two motors 71 can also ensure the stability and reliability of the movement of the flexible display screen assembly 30.

Further, in this embodiment, the driving mechanism 70 drives the second portion 14 and the reel 20 by means of a gear transmission and a gear-rack transmission. It may be understood that, in other embodiments, the driving mechanism 70 may also drive the second portion 14 and the reel 20 by means of a combination of a belt transmission and the gear-rack transmission or a combination of a chain transmission and the gear-rack transmission. For example, the first transmission structure 72 adopts the gear-rack transmission, and the second transmission structure 74 may adopt the belt transmission or the chain transmission, which is not limited herein.

In addition, in some embodiments, the driving mechanism 70 may only include the motor 71 arranged on the first portion 12 and the first transmission structure 72 connected with the motor 71, and the motor 71 may drive the second portion 14 to move relative to the first portion 12 through the first transmission structure 72. Furthermore, the electronic device 100 may also include a restoring mechanism 80 connected to the reel 20, and the restoring mechanism 80 is configured to exert a force on the flexible display screen assembly 30 through the reel 20, so as to keep a tendency of the flexible display screen 32 being wound on the reel 20.

Figure 17:
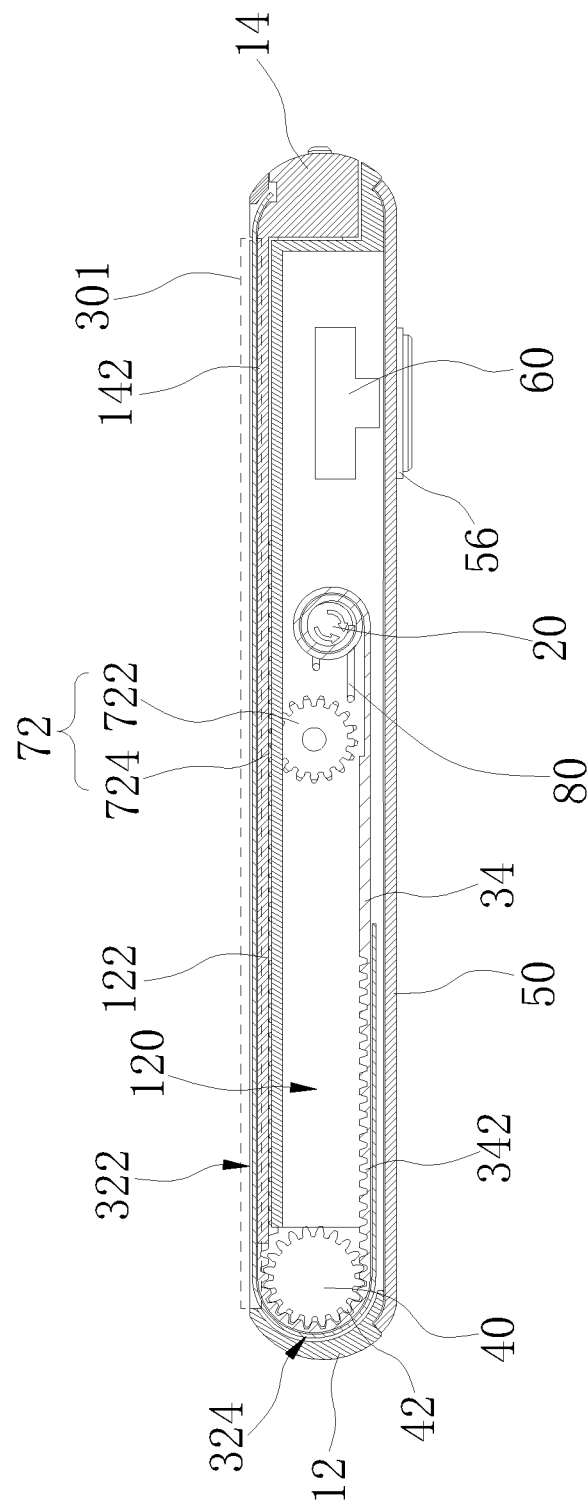
FIG. 17 is further another sectional view of an electronic device according to an embodiment of the present disclosure.

As illustrated in FIG. 17, the driving mechanism 70 includes the motor 71 arranged on the first portion 12 and the first transmission structure 72 connected with the motor 71. The motor 71 is configured to drive the second portion 14 to move relative to the first portion 12 through the first transmission structure 72, and the second transmission structure 74 is omitted.

Further, as illustrated in FIGS. 17 to 20, the electronic device 100 may also include the restoring mechanism 80, and the restoring mechanism 80 may also be arranged in the accommodating chamber 120. The restoring mechanism 80 is connected with the reel 20, and is configured to exert a restoring force to the flexible display screen assembly 30 so as to keep a tendency of the flexible display screen assembly 30 being wound on the reel 20.

The restoring mechanism 80 exerts the restoring force on the reel 20, and the reel 20 keeps the tendency of the flexible display screen assembly 30 being wound on the reel 20 under the restoring force. In other words, when the second portion 14 is not subject to an external force to move relative to the first portion 12, the reel 20 rotates under the restoring force of the restoring mechanism 80, such that the other end of the flexible display screen assembly 30 is wound on the reel 20. In this case, the first portion 12 and the second portion 14 are fully fitted together, and the electronic device 100 is in the narrow screen mode.

When the second portion 14 is subject to the external force (e.g. an action force exerted to the second portion 14 by the driving mechanism 70) and the external force is greater than or equal to the restoring force of the restoring mechanism 80, the second portion 14 moves away from the first portion 12, so as to drive the reel 20 to rotate to release the flexible display screen assembly 30 against the restoring force, thereby expanding the display portion 30 of the flexible display screen assembly 301.

It may be understood that, due to an existence of the restoring mechanism 80, during the expansion of the display portion 301 of the flexible display screen 32, the restoring mechanism 80 continuously exerts a tension force to the flexible display screen assembly 30, such that the flexible display screen 32 can be wound and released in a balanced manner, that is, the flexible display screen 32 is kept flat all the time.

It may also be understood that, in other embodiments, in the case that the electronic device 100 includes the restoring mechanism 80, the drive mechanism 70 may also include the motor, the first transmission structure 72 and the second transmission structure 74 in the above embodiment, the first transmission structure 72 is connected with the second portion 14 and the motor, and the second transmission structure 74 is connected with the first transmission structure 72 and the reel 20. In this embodiment, when the display region 301 needs to be narrowed, the motor may not work, while the restoring force of the restoring mechanism 80 is used to drive the reel 20 to rotate reversely to wind the flexible display screen assembly 30, and also to drive the second portion 14 to move towards the first portion 12, i.e. moving close to the first portion 12.

Figure 18:
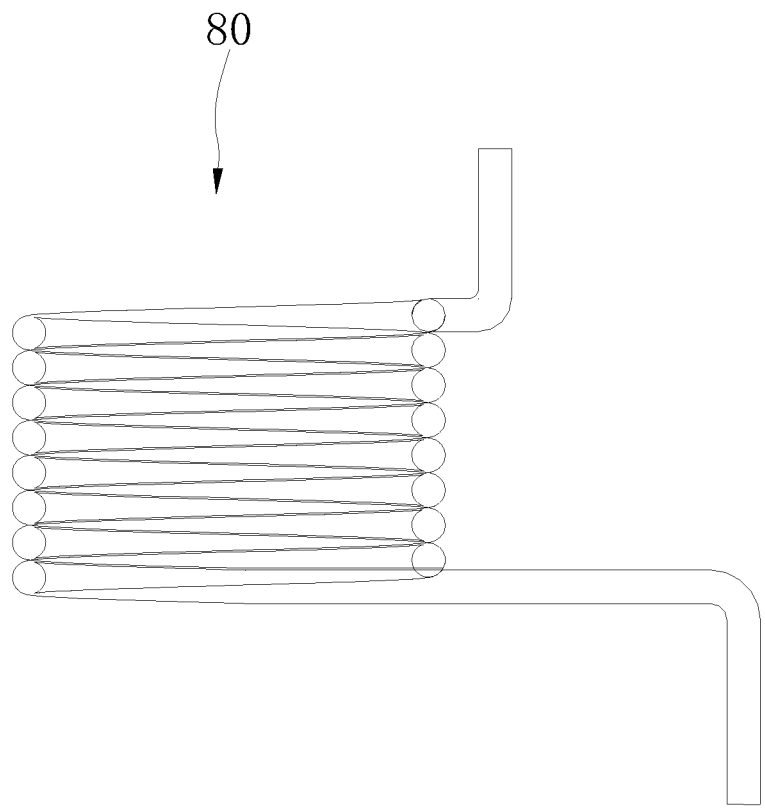
FIG. 18 is a schematic view of a restoring mechanism of an electronic device according to an embodiment of the present disclosure.

Further, as illustrated in FIG. 18, the restoring mechanism 80 may include an elastic element connected to the reel 20 and configured to exert the restoring force to the reel 20. The elastic element may be a spring, such as a torsion spring as illustrated in FIG. 18. Certainly, the elastic element may also be an element having an elastic resorting force, such as a rubber, which is not limited herein.

Figure 19:
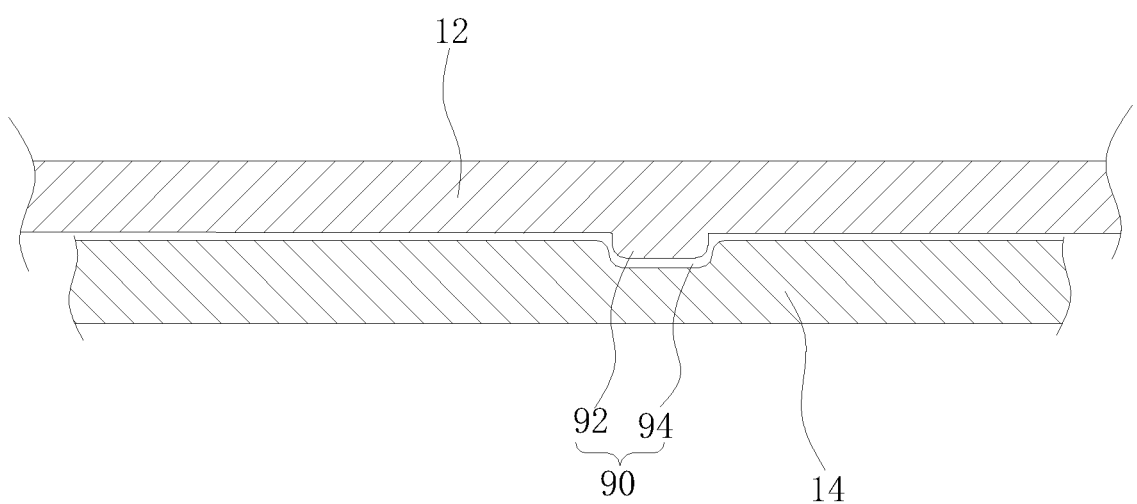
FIG. 19 is a schematic view of a position limiting structure of an electronic device according to an embodiment of the present disclosure.

Further, as illustrated in FIG. 19, in this embodiment, the electronic device 100 may also include a position limiting structure 90. The position limiting structure 90 is arranged to the housing 10 and configured to limit the rotation of the reel 20 when the second portion 14 moves to a predetermined position relative to the first portion 12. In other words, when the second portion 14 moves to the predetermined position relative to the first portion 12, the position limiting structure 90 can prevent the second portion 14 and the flexible display screen assembly 30 from retracting under the action of the restoring force of the restoring mechanism 80.

As illustrated in FIG. 19, in this embodiment, the position limiting structure 90 includes a position limiting block 92 provided on the first portion 12 and a position limiting groove 94 formed in the second portion 14. When the second portion 14 moves to the predetermined position relative to the first portion 12, the position limiting block 92 is engaged in the position limiting groove 94. In this way, even if the external force on the second portion 14 is removed, the second portion 14 and the flexible display screen assembly 30 will not retract under the action of the restoring force of the restoring mechanism 80 due to the engagement of the position limiting block 92 and the position limiting groove 94, so as to ensure the electronic device 100 to be in the expanded mode.

It should be noted that the above "predetermined position" may be a relative position of the second portion 14 and the first portion 12 when the two moves away from each other to the limit position, or may be any position before the limit position.

Figure 20:
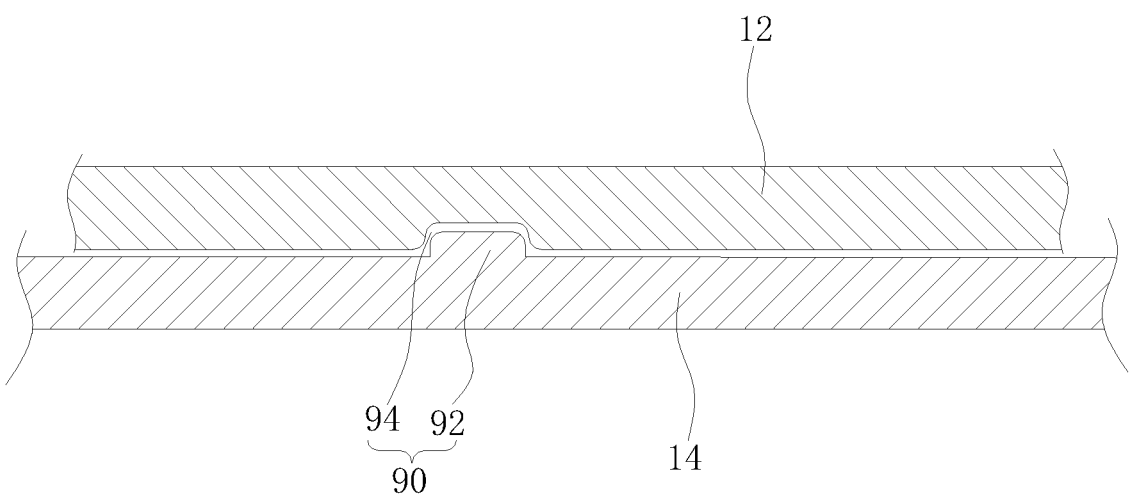
FIG. 20 is another schematic view of a position limiting structure of an electronic device according to an embodiment of the present disclosure.

It may be understood that, as illustrated in FIG. 20, in other embodiments, the position limiting groove 94 may be formed in the first portion 12 and the position limiting block 92 may be provided to the second portion 14. In addition, in some embodiments, the position limiting block may be provided to the first portion 12, and the position limiting groove may be formed in the reel 20. When the second portion 14 moves to the predetermined position, the position limiting block is engaged in the position limiting groove. In such a case, the position limiting block may be engaged in the position limiting groove by a manual press or an electric drive, such that the reel will not rotate relative to the first portion, and thus the second portion 14 and the flexible display screen assembly 30 will not retract under the action of the restoring mechanism 80. Certainly, in other embodiments, the position limiting structure 90 may also include a stopper, and the restoring mechanism 80 may include a torsion spring. When the second portion 14 is moved to the predetermined position, the stopper can stop the torsion spring to counteract the restoring force of the torsion spring. In addition, it may also be understood that, in some embodiments, the position limiting structure 90 may also include an elastic assembly arranged to the first portion 12 and a first snap part formed to the second portion 14. The elastic assembly may include a press member, a spring and a second snap part, the press member is mounted to the first portion 12, the spring is connected with the press member and the second snap part, and the press member is configured to drive the second snap part to move by the spring under an external force, so as to snap with the first snap part, thereby limiting the relative position of the first portion 12 and the second portion 14. Thus, when the second portion 14 moves to the predetermined position, the user can press the press member, and then the first snap part snaps with the second snap part, thereby preventing the second portion 14 from retracting under the restoring force of the restoring mechanism 80, so as to keep the electronic device 100 in the expanded mode. It may be understood that, when the press member is pressed again, the first snap part and the second snap part are separated, such that the second portion 14 and the flexible display screen assembly 30 can retract under the action of the restoring mechanism 80, and thus the electronic device 100 returns from the expanded mode to the narrow screen mode.

The working principle of the electronic device 100 of the present embodiment will be introduced below.

As illustrated in FIGS. 4 to 7, as described above, the electronic device 100 can switch between the narrow screen mode and the expanded mode. In a state illustrated in FIGS. 4 and 5, the electronic device 100 is in the narrow screen mode, and in a state illustrated in FIGS. 6 and 7, the electronic device 100 is in the expanded mode. In the narrow screen mode, the first portion 12 and the second portion 14 are fitted to form the housing 10. The one end of the flexible display screen assembly 30 is connected with the second portion 14, and the other end of the flexible display screen assembly 30 is wound on the reel 20. In this case, only a small part of the flexible display screen assembly 30 is exposed from the housing 10, and thus the display portion 301 is narrow, such that it is convenient for the user to carry the electronic device 100.

When the user needs a large display portion 301, the second portion 14 may be driven to move away from the first portion 12 by the driving mechanism 70. In this case, the second portion 14 drives the one end of the flexible display screen 32 to move, and the driving mechanism 70 also drives the reel 20 to rotate and hence release the flexible display screen assembly 30. Thus, a part of the flexible display screen assembly 30 hidden inside the housing 10 is gradually pulled out by the second portion 14 (that is, moving from the state illustrated in FIG. 4 to the state illustrated in FIG. 6), so as to achieve the purpose of expanding the display portion 301 of the flexible display screen assembly 30. Thus, an area of the display portion 301 is relatively large, thereby facilitating the user's operations so as to improve the user's operation experiences.

When the electronic device 100 needs to switch from the expanded mode to the narrow screen mode, the motor 71 of the driving mechanism 70 only needs to rotate reversely to drive the second portion 14 to move towards the first portion 12, thus releasing the flexible display screen assembly 30. The reel 20 also is reversely rotated accordingly, so as to synchronously wind up the flexible display screen assembly 30. When the first portion 12 and the second portion 14 move towards each other to the limit position, the motor 71 stops operating, and the electronic device 100 returns to the narrow screen mode. In other words, when the first portion 12 and the second portion move away from each other, the display portion of the flexible display screen assembly 30 is expanded, and when the first portion 12 and the second portion move towards each other, the expanded display portion of the flexible display screen assembly 30 can be received in the accommodating chamber 120.

Figure 21:
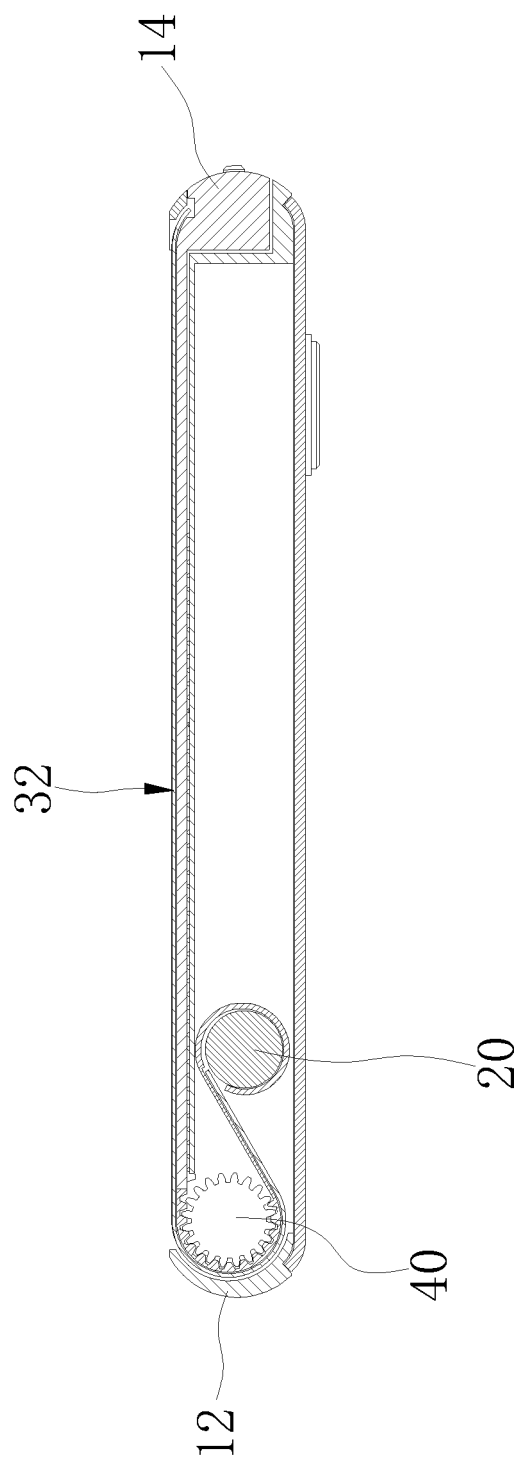
FIG. 21 is further another schematic view of an electronic device according to an embodiment of the present disclosure.

In addition, in the embodiment illustrated in FIGS. 5 and 7, when the second portion 14 moves away from the first portion 12, the reel 20 is driven to rotate clockwise by the driving mechanism 70, so as to release the flexible display screen assembly 30, thereby expanding the display portion 301 of the flexible display screen assembly 30. When the second portion 14 moves towards the first portion 12, the reel 20 is driven to rotate anticlockwise by the driving mechanism 70, so as to wind the flexible display screen assembly 30, thereby reducing the display portion 301 of the flexible display screen assembly 30. It may be understood that, as illustrated in FIG. 21, in other embodiments, when the second portion 14 moves away from the first portion 12, the reel 20 may be driven to rotate anticlockwise by the driving mechanism 70, so as to release the flexible display screen assembly 30, thus expanding the display portion 301 of the flexible display screen assembly 30. When the second portion 14 moves towards the first portion 12, the reel 20 may be driven to rotate clockwise by the driving mechanism 70, so as to wind the flexible display screen assembly 30, thus reducing the display portion 301 of the flexible display screen assembly 30. The driving mechanism 70 is not illustrated in FIG. 21. In other words, rotation directions of the reel 20 when winding and releasing the flexible display screen assembly 30 in the example illustrated in FIG. 21 are opposite to those rotation directions in the example illustrated in FIGS. 5 and 7.

Another embodiment of the electronic device 100 of the present disclosure is illustrated in FIGS. 22 to 27. The electronic device 100 includes a housing 10, a reel 20, a flexible display screen assembly 30, a limiting member 40, a cover body 50, a camera 60, and a driving mechanism. The reel 20, the flexible display screen assembly 30, the limiting member 40, the cover body 50, the camera 60 and the driving mechanism are all arranged in the housing 10, and the driving mechanism is not illustrated in FIGS. 22 to 27.

Figure 23:
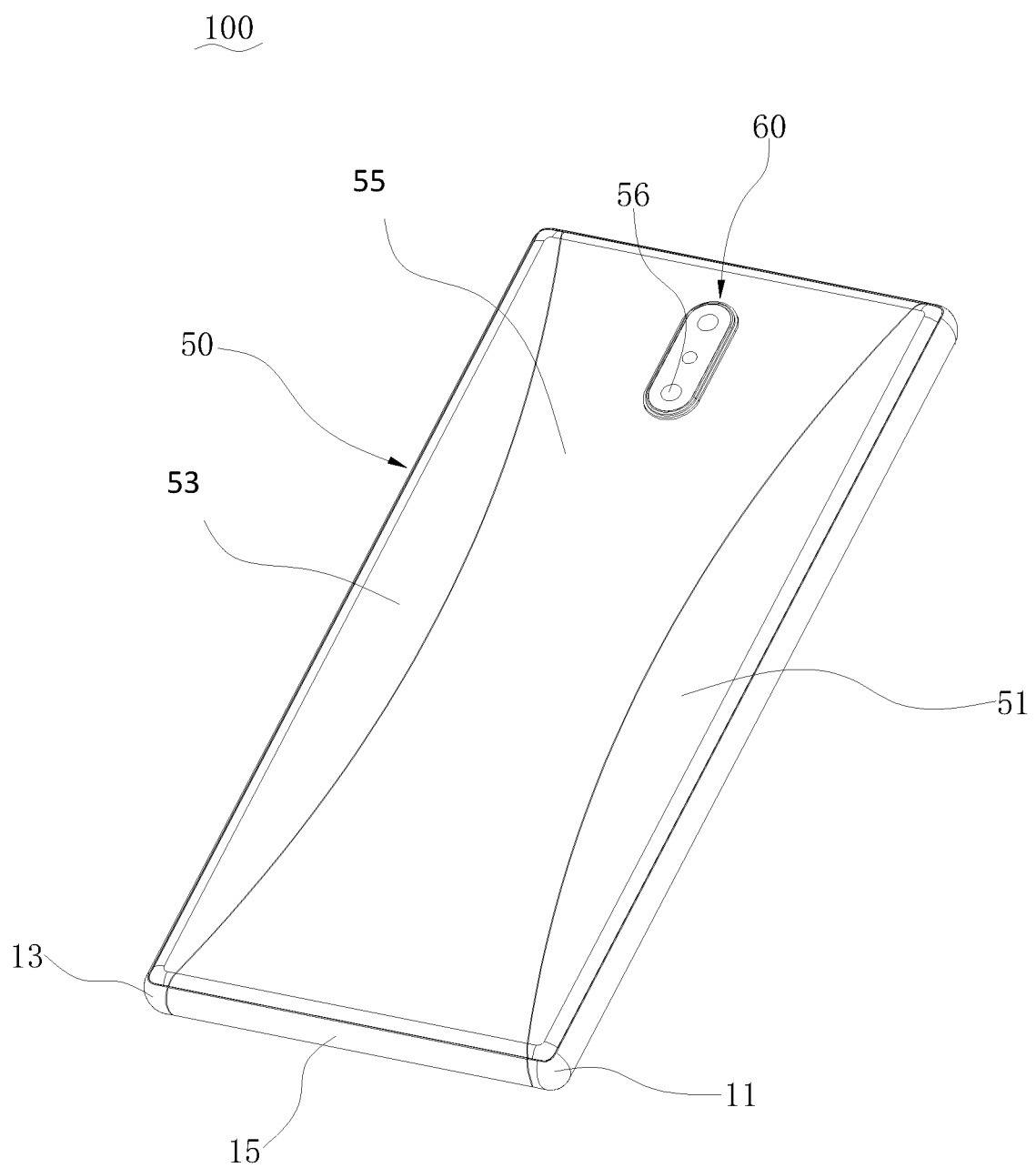
FIG. 23 is further another schematic view of an electronic device according to an embodiment of the present disclosure.
Figure 24:
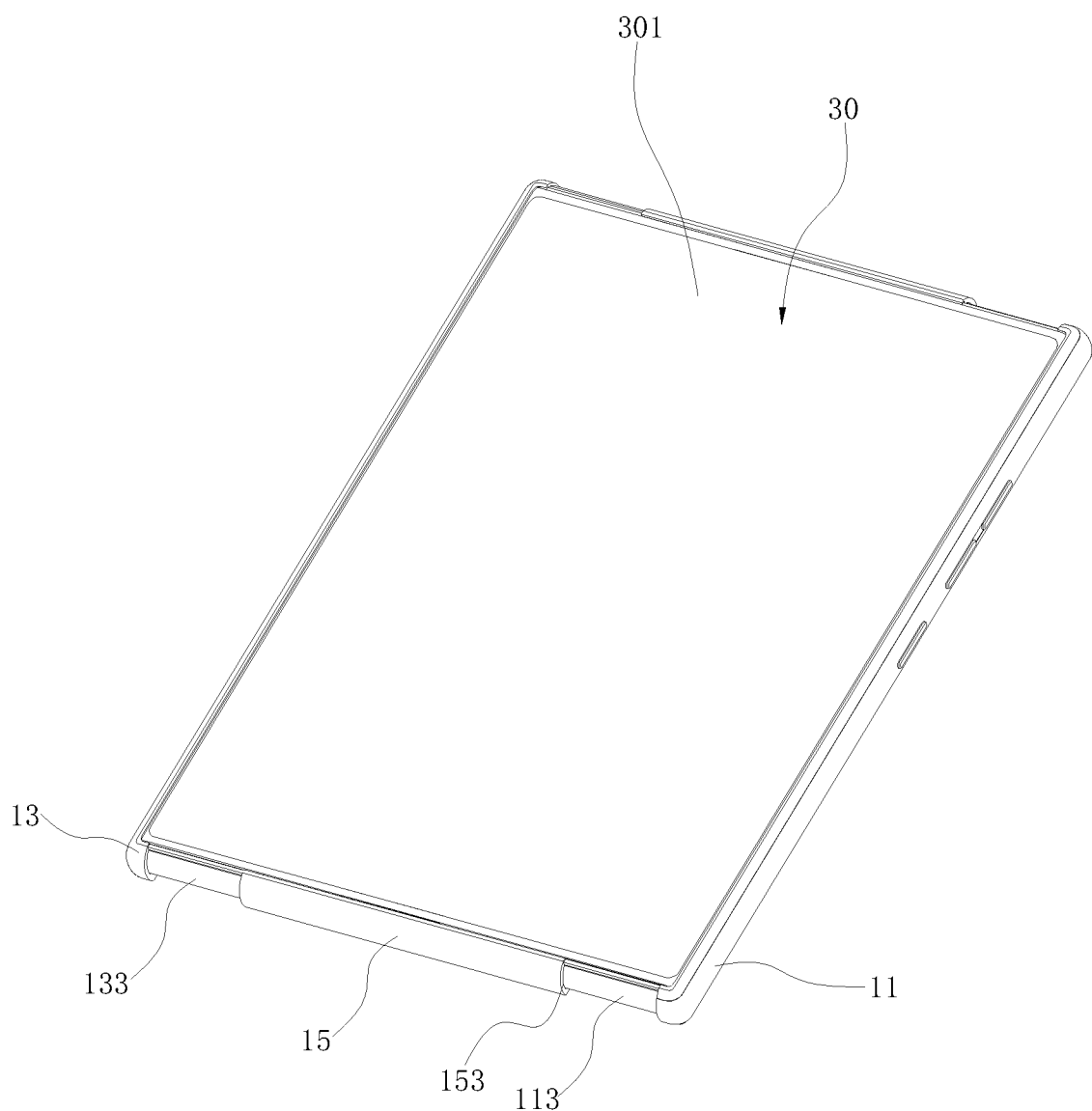
FIG. 24 is further another schematic view of an electronic device according to an embodiment of the present disclosure.
Figure 25:
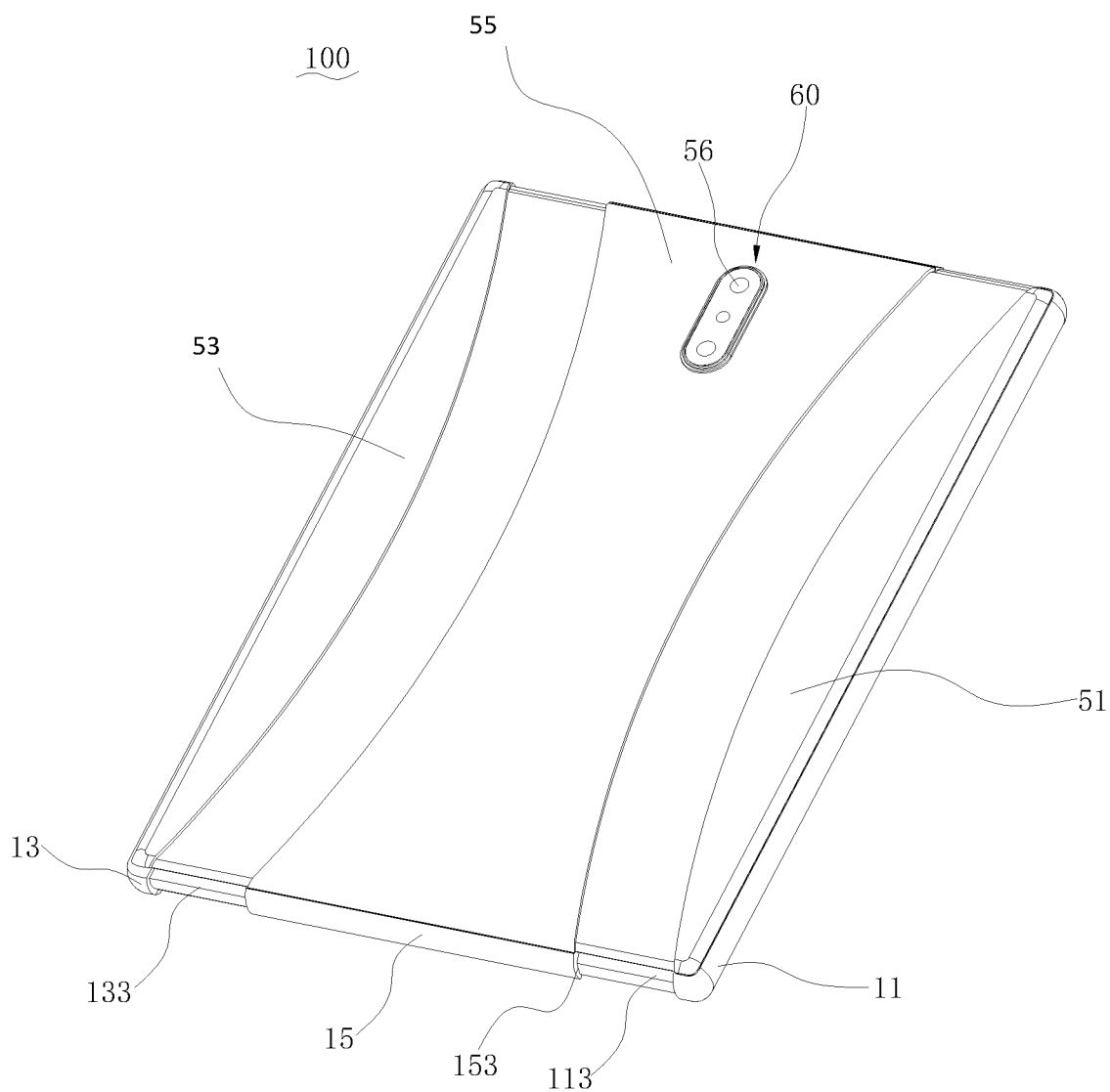
FIG. 25 is further another schematic view of an electronic device according to an embodiment of the present disclosure.

As illustrated in FIGS. 23 to 25, in this embodiment, the housing 10 includes a first portion 11, a second portion 13 and a third portion 15. The first portion 11 and the second portion 13 are located on two opposite sides of the third portion 15, respectively, and both the first portion 11 and the second portion 13 can move relative to the third portion 15.

In this embodiment, the first portion 11 is slidably connected with the third portion 15, and the second portion 13 is also slidably connected with the third portion 15. The first portion 11 and the second portion 13 have substantially identical structures and are symmetrically arranged on the two sides of the third portion 15.

Figure 26:
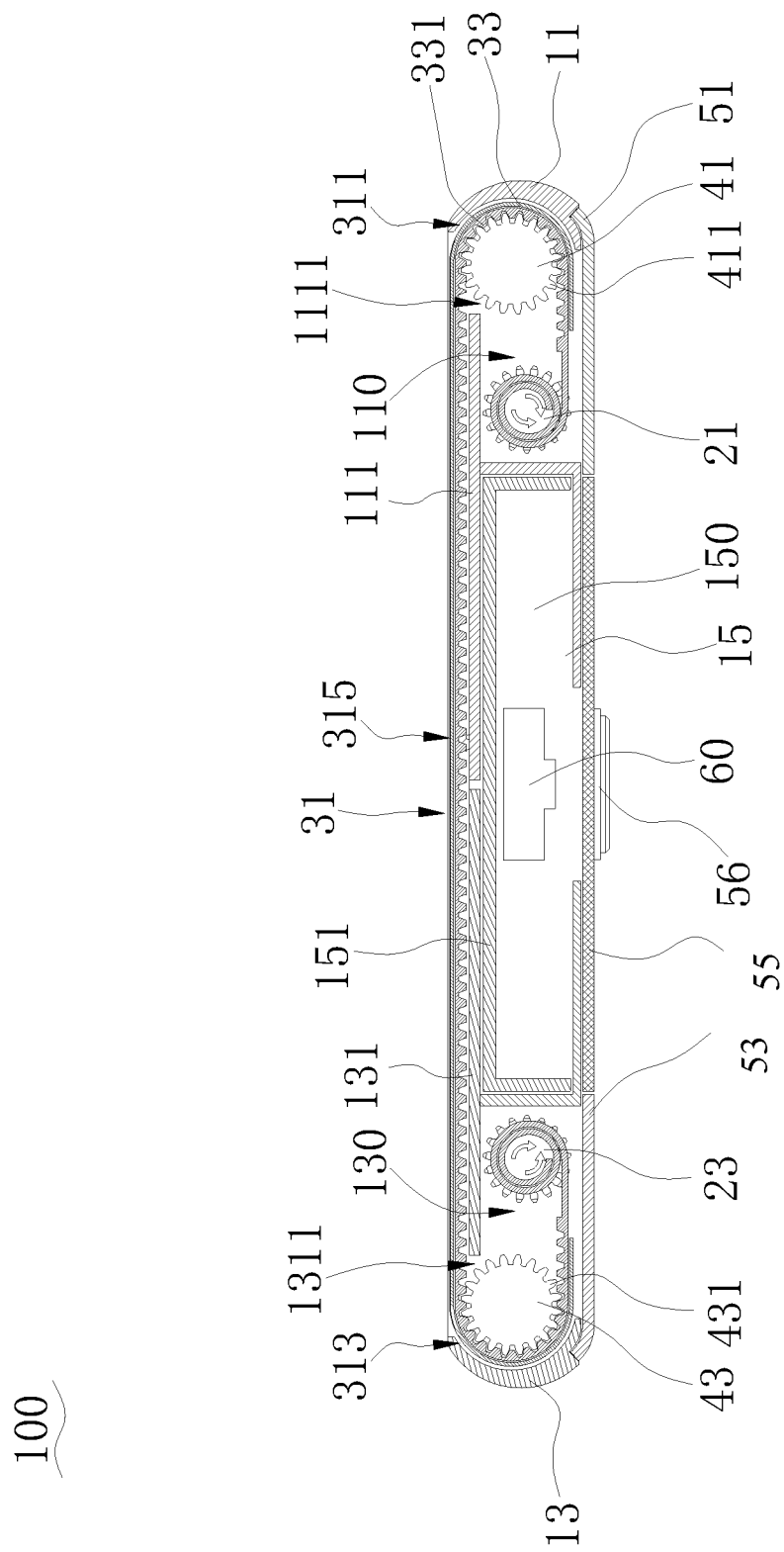
FIG. 26 is further another sectional view of an electronic device according to an embodiment of the present disclosure.
Figure 27:
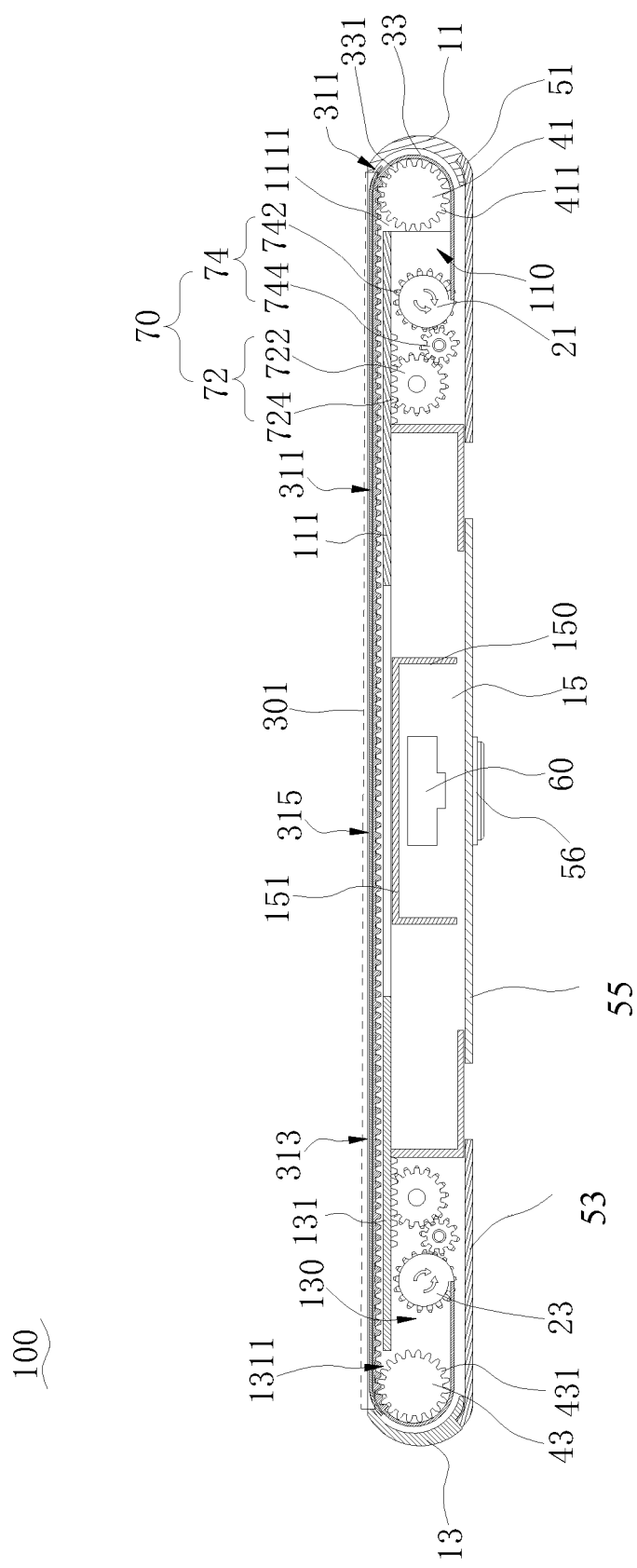
FIG. 27 is further another sectional view of an electronic device according to an embodiment of the present disclosure.

Further, as illustrated in FIG. 26 and FIG. 27, the first portion 11 has a substantially hollow cuboid shape, and defines a first storage chamber 110 therein, and a bottom of the first storage chamber 110 is open. The first storage chamber 110 is configured to receive components such as the reel 20, the limiting member 40, and the driving mechanism. The first portion 11 includes a first sliding part 113 and a first top plate 111. Two first sliding parts 113 are provided and connected to two symmetric sides of the first top plate 111 in a longitudinal direction of the first top plate 111, respectively, and the first sliding part 113 is fitted with the third portion 15 to achieve a sliding connection of the first portion 11 and the third portion 15.

The first top plate 111 is provided with a first opening 1111 communicated with the first storage chamber 110. The first opening 1111 may be arranged along a longitudinal direction of the electronic device 100, and an end of the flexible display screen assembly 30 passes through the first opening 1111 to be connected with the reel 20.

As illustrated in FIGS. 26 and 27, in this embodiment, the second portion 13 includes a second sliding part 133 and a second top plate 131. Two second sliding parts 133 are provided and connected to two symmetric sides of the second top plate 131 in a longitudinal direction of the second top plate 131, respectively, and the second sliding part 133 is fitted with the third portion 15 to achieve a sliding connection of the second portion 13 and the third portion 15.

The second top plate 131 is provided with a second opening 1311 communicated with a second storage chamber 130 defined in the second portion 13. The second opening 1311 may be also provided along the longitudinal direction of the electronic device 100, and the other end of the flexible display screen assembly 30 passes through the second opening 1113 to be connected with the reel 20.

As further illustrated in FIGS. 24 to 27, the third portion 15 has a substantially hollow cuboid shape, and defines a receiving chamber 150 therein. A bottom of the receiving chamber 150 is open, and the cover body 50 covers the bottom of the receiving chamber 150. The receiving chamber 150 is configured to receive components such as the camera 60 and the mainboard 101. Certainly, the receiving chamber 150 may also be configured to stack and arrange other electrical elements of the electronic device 100, such as a sub board 103, a processor, a sensor, a battery 102, or the like.

The third portion 15 is further provided with a sliding groove 153, and the sliding groove 153 is configured to be slidably fitted with the first portion 11 and the second portion 13, such that the first portion 11 and the second portion 13 can slide relative to the third portion 15. The third portion 15 includes a third top plate 151, and the third top plate 151 is located under the first top plate 111 and the second top plate 131 and is substantially attached to the first top plate 111 and the second top plate 131. The structures of the first portion 11 and the second portion 13 are substantially the same, the thicknesses of the first top plate 111 and the second top plate 131 are the same, too, and an upper surface of the third top plate 151 is substantially attached to a lower surface of the first top plate 111 and a lower surface of the second top plate 131. It should be noted that, in the context, "attach" may be understood as a meaning that two are in contact with each other without affecting the sliding therebetween, or may be understood as a meaning that a gap between the two is within a range of an assembly error.

In this embodiment, the first portion 11 may slide relative to the third portion 15 so as to be way from or close to a side of the third portion 15, the second portion 13 may also slide relative to the third portion 15 so as to be away from or close to the other side of the third portion 15. As illustrated in FIGS. 23 and 27, in this embodiment, "the first portion 11 and the second portion 13 move away from each other" may be understood as a meaning that, the first portion 11 slides relative to a side of the third portion 15 and a sliding direction thereof faces away from the third portion 15, and the second portion 13 slide relative to the other side of the third portion 15 and a sliding direction thereof faces away from the third portion 15, for example, moving from a state illustrated in FIGS. 22 and 26 to a state illustrated in FIGS. 24 and 27. In addition, in this embodiment, the first portion 12 and the second portion 13 may also move towards each other, which may be understood as a meaning that, the first portion 11 and the second portion 13 slide relative to the two sides of the third portion 15, respectively, and the sliding directions thereof face towards the third portion 15, for example, moving from the state illustrated in FIGS. 24 and 27 to the state illustrated in FIGS. 22 and 26.

It may be understood that, in other embodiments, "the first portion 11 and the second portion 13 move away from each other" may also be understood as a meaning that the first portion 11 is still relative to the third portion 15, and the second portion 13 moves away from the third portion 15, or the first portion 11 moves away from the third portion 15, and the second portion 13 is still relative to the third portion 15.

As illustrated in FIG. 26, in this embodiment, when the first portion 11 and the second portion 13 move towards the third portion 15 to a limit position (that is, when the first portion 11 and the second portion 13 move close to the third portion 15 until the three are fitted together), the three of the first portion 11, the second portion 13 and the third portion 15 forms the housing 10 having a substantially cuboid shape.

As illustrated in FIGS. 26 and 27, in this embodiment, the reel 20 includes a first reel 21 and a second reel 23. The first reel 21 is rotatably arranged to the first portion 11 and located in the first storage chamber 110. In other words, the first reel 21 may be mounted in the first storage chamber 110 and is rotatable relative to the first portion 11. The first reel 21 is connected to one end of the flexible display screen assembly 30, so as to release or wind the flexible display screen assembly 30.

The structures of the second reel 23 and the first reel 21 are substantially the same, the second reel 23 and the first reel 21 are symmetrically arranged with respect to a center of the housing 10, and the second reel 23 is rotatably arranged to the second portion 13 and located in the second storage chamber 130. In other words, the second reel 23 may be mounted in the second storage chamber 130 and is rotatable relative to the second portion 13. The second reel 23 is connected to the other end of the flexible display screen assembly 30, so as to release or wind the flexible display screen assembly 30. In other words, the first reel 21 and the second reel 23 are connected to the two ends of the flexible display screen assembly 30, respectively. The flexible display screen assembly 30 is symmetrically arranged with respect to the center of the housing 10. In other words, a part of the flexible display screen assembly 30 wound on the first reel 21 is symmetrical with another part of the flexible display screen assembly 30 wound on the second reel 23.

It may be understood that, the first reel 21 being rotatably arranged to the first portion 11 may refer to that the first reel 21 is directly mounted to the first portion 11, or the first reel 21 is mounted to the first portion 11 by means of other media, and that, the second reel 23 being rotatably arranged to the second portion 13 may refer to that the second reel 23 is directly mounted to the second portion 13, or the second reel 23 is mounted to the second portion 13 by means of other media.

As illustrated in FIGS. 26 and 27, the two ends of the flexible display screen assembly 30 are connected to the first reel 21 and the second reel 23, respectively. The one end of the flexible display screen assembly 30 passes through the first opening 1111 of the first portion 11 and then is connected with the first reel 21, and the other end of the flexible display screen assembly 30 passes through the second opening 1311 of the second portion 13 and then is connected with the second reel 23. When the first portion 11 and the second portion 13 move away from each other, that is, when the first portion 11 and the second portion 13 both move away from the third portion 15, the first reel 21 and the second reel 23 can rotate simultaneously to gradually release the flexible display screen assembly 30, thereby expanding the display portion 301 of the flexible display screen assembly 30.

In this way, a size of a screen display region of the electronic device 100 can be freely adjusted. When a large screen is needed, the display portion 301 of the flexible display screen assembly 30 can be expanded to improve user's operation experiences. When the large screen is not needed, the display portion 301 may be not expanded, such that an overall size of the electronic device 100 is small and it is easy to carry the electronic device 100.

It may be understood that, in other embodiments, when "the first portion 11 and the second portion 13 move away from each other" is understood as the meaning that the first portion 11 is still relative to the third portion 15, and the second portion 13 moves away from the third portion 15, only the second reel 23 rotates to release the end of the flexible display screen assembly 30 to expand the display portion 301. In addition, when "the first portion 11 and the second portion 13 move away from each other" is understood as the meaning that the first portion 11 moves away from the third portion 15, and the second portion 13 is still relative to the third portion 15, only the first reel 21 rotates to release the end of the flexible display screen assembly 30 to expand the display portion 301.

Figure 22:
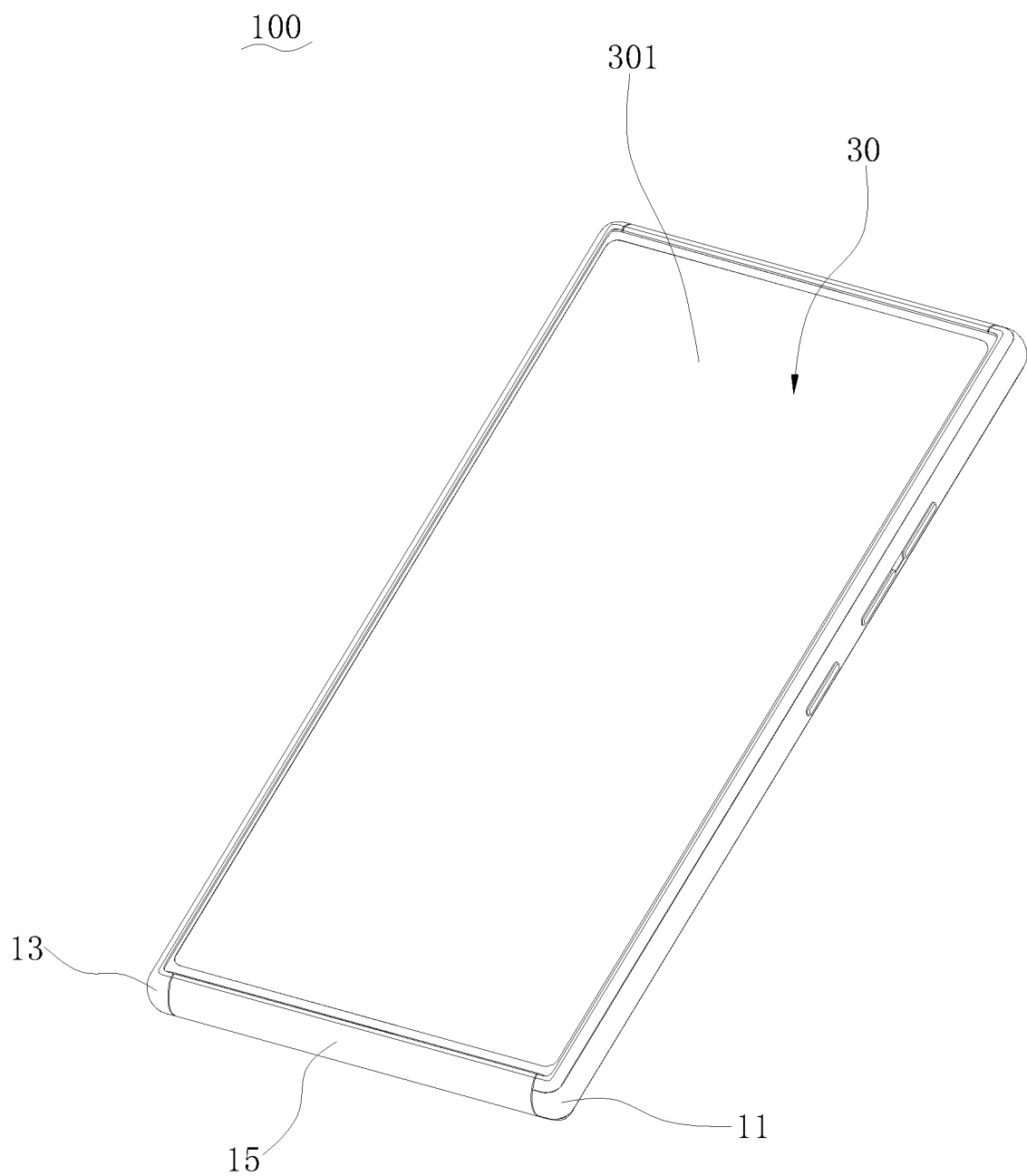
FIG. 22 is further another schematic view of an electronic device according to an embodiment of the present disclosure.

In addition, it may be understood that, in this embodiment, in a case that the first portion 11 and the second portion 13 are adjacent to and fully fitted with the third portion 15, the display portion 301 of the flexible display screen assembly 30 is not expanded, and the electronic device 100 is in a narrow screen mode (such as the state illustrated in FIGS. 22 and 26). Moreover, the one end of the flexible display screen assembly 30 is wound on the first reel 21, the other end of the flexible display screen assembly 30 is wound on the second reel 23, and a part thereof exposed from the housing 10 (i.e., the display portion 301) is used for display.

When the display portion 301 of the flexible display screen assembly 30 needs to be expanded, the first portion 11 and the second portion 13 move away from each other. Thus, the first portion 11 and the second portion 13 move away from each other, and the first reel 21 and the second reel 23 also move away from each other. Since the two ends of the flexible display screen assembly 30 are connected with the first reel 21 and the second reel 23, respectively, the first reel 21 and the second reel 23 will rotate simultaneously to release the two ends of the flexible display screen assembly 30 while moving away from each other, thereby expanding the display portion 301 of the flexible display screen assembly 30. In such a case, the electronic device 100 is in an expanded mode (e.g., the state illustrated in FIGS. 24 and 27).

It may be understood that, there is a limit position when the second portion 13 and the first portion 11 move away from each other, i.e. a limit position of the two moving away from the third portion 15. In the limit position, the display region of the electronic device 100 is the largest, that is, the display portion 301 of the flexible display screen assembly 30 is the largest (as illustrated in FIG. 24). When the first portion 11 and the second portion 13 are adjacent to and fully fitted with the third portion 15, the display region of the electronic device 100 is the smallest, that is, the display portion 301 of the flexible display screen assembly 30 is the smallest (as illustrated in FIG. 22).

It should be noted that, in this embodiment, "the display portion 301 of the flexible display screen assembly 30" may also be understood as a part thereof exposed from the housing 10.

As illustrated in FIGS. 26 and 27, in this embodiment, the flexible display screen assembly 30 includes a flexible display screen 31 and a flexible support 33 stacked and fixedly connected with the flexible display screen 31.

The flexible display screen 31 includes a first region 315, a second region 311 and a third region 313, and the second region 311 and the third region 313 are connected to two ends of the first region 315, respectively. The first region 315 is located above the first top plate 111 and the second top plate 131, and a size of the first region 315 is substantially equal to a sum of areas of the first top plate 111 and the second top plate 131. The second region 311 is at least partially located in the first storage chamber 110 of the first portion 11 and is connected with the flexible support 33.

The third region 313 is at least partially located in the second storage chamber 130 of the second portion 13 and is connected with the flexible support 33. In this embodiment, the display portion 301 of the flexible display screen assembly 30 being expanded may be understood as a meaning that the second region 311 located in the first storage chamber 110 or the third region 313 located in the second storage chamber 130 is pulled out, or both of the two are pulled out simultaneously, so as to be exposed from the housing 10, thereby expanding the display portion 301 used for display of the flexible display screen assembly 30, that is, expanding the display region of the electronic device 100.

The flexible support 33 is arranged to a bottom of the flexible display screen 31 and covers a lower surface of the flexible display screen 31. The flexible support 33 may be fixedly connected with the flexible display screen 31 through an optically clear adhesive. In the example illustrated in FIG. 26 and FIG. 27, both ends of the flexible support 33 exceed beyond the flexible display screen 31, and the exceeding portions of the flexible support 33 are connected with the first reel 21 and the second reel 23, respectively. As illustrated in FIG. 26, when the electronic device 100 is in the narrow screen mode, one end of the flexible support 33 is wound on the first reel 21 and the other end thereof is wound on the second reel 23. The flexible display screen 31 roughly has a runway shape. The electrical components of the electronic device 100 such as the mainboard 101, the sub board 103, the sensor and the battery 102 may be stored in the space enclosed by the flexible display screen assembly 30. In this way, the arrangement of the flexible display screen assembly 30 will not affect the placement of the electrical components such as the mainboard 101 and the battery 102, thus effectively improving the space utilization, and facilitating the stacking and the placement of the electrical components such as the mainboard 101 and the battery 102.

In addition, when the electronic device 100 is in the narrow screen mode, the first reel 21 and the second reel 23 only wind the two ends of the flexible support 33, while the flexible display screen 31 will not be directly wound by the first reel 21 and the second reel 23, thus improving a service life of the flexible display screen 31. Certainly, it may be understood that, in other embodiments, the flexible display screen 31 can also be connected with the first reel 21 and the second reel 23 respectively after fully corresponding with the flexible support 33.

As illustrated in FIGS. 26 and 27, in this embodiment, when the first portion 11 and the second portion 13 move away from each other, the flexible support 33 abuts against the first portion 11 and the second portion 13 to keep the flexible display screen 31 flat. When the first portion 11 and the second portion 13 move away from each other, the flexible support 33 is attached to the first portion 11 and the second portion 13. Thus, the flexible support 33 can increase a strength of the flexible display screen 31, ensure the flexible display screen 31 to be flat and stable during the movement, and prevent the flexible display screen 31 from being damaged under a large force.

In addition, a first tooth part 331 is provided to a bottom of the flexible support 33 and is configured to mesh with the limiting member 40 such that the limiting member 40 can support the flexible display screen assembly 30 and keep the flexible display screen assembly 30 to move smoothly.

As further illustrated in FIGS. 26 and 27, the limiting member 40 includes a first limiting member 41 and a second limiting member 43. The first limiting member 41 is rotatably arranged to the first portion 11 and is located in the first storage chamber 110. The first limiting member 41 has a cylindrical shape, and a second tooth part 411 is provided on a circumferential surface of the first limiting member 41.

The second limiting member 43 is rotatably arranged to the second portion 13 and located in the second storage chamber 130. The second limiting member 43 is symmetrical with the first limiting member 41. The second limiting member 43 also has a cylindrical shape, and a third tooth part 431 is provided on a circumferential surface of the second limiting member 43.

Both the second tooth part 411 and the third tooth part 431 are configured to mesh with the first tooth part 331 of the flexible support 33 so as to support the flexible display screen assembly 30 and guide an expansion of the flexible display screen assembly 30.

In this way, the first limiting member 41 and the second limiting member 43 can limit a form of the flexible display screen assembly 30 such that the display portion 301 of the flexible display screen assembly 30 can be in a flat state, that is, the flexible display screen assembly 30 can be kept in a runway-shape state. In addition, the first limiting member 41 and the second limiting member 43 are meshed with the flexible support 33 to support the flexible display screen assembly 30, and to guide the flexible display screen assembly 30 while the first reel 21 and the second reel 23 release the flexible display screen assembly 30, so as to ensure the flexible display screen assembly 30 to expand stably.

In this embodiment, the first limiting member 41 is a guide gear, the first limiting member 41 is arranged at a position corresponding to the first opening 1111, the one end of the flexible support 33 is wound around the first limiting member 41, and the first tooth part 331 of the flexible support 33 is meshed with the second tooth part 411. The second limiting member 43 may also be another guide gear, the second limiting member 43 is arranged at a position corresponding to the second opening 1311, the other end of the flexible support 33 is wound around the second limiting member 43, and the first tooth part 331 of the flexible support 33 is meshed with the third tooth part 431. In other words, the one end of the flexible display screen assembly 30 passes through the first opening 1111, wound around the first limiting member 41, and is connected with the first reel 21, and the other end of the flexible display screen assembly 30 passes through the second opening 1311, wound around the second limit member 43, and is connected with the second reel 23. When the first portion 11 and the second portion 13 move away from each other, the first limiting member 41 and the second limiting member 43 gradually rotate under the drive of the flexible support 33, and the first reel 21 and the second reel 23 gradually release the flexible support 33, such that more portion of the flexible display screen 31 is exposed out of the housing 10 to achieve the purpose of expanding the display portion 301. In addition, as illustrated in FIG. 26, in this embodiment, the structures of the first limiting member 41 and the second limiting member 43 are substantially the same.

It may be understood that, in other embodiments, the first limiting member 41 and the second limiting member 43 may be not provided with the tooth part, but directly be a smooth shaft or a roller, and the flexible display screen assembly 30 may be wound around the roller directly. In this way, the first limiting member 41 and the second limiting member 43 can also support and guide the flexible display screen 31.

As illustrated in FIGS. 26 and 27, in this embodiment, the camera 60 is arranged in the receiving chamber 150 of the third portion 15, and the cover body 50 covers the bottom of the third portion 15 to enclose the receiving chamber 150. In other words, in this embodiment, when the second portion 13 moves relative to the first portion 11, the camera 60 will not move together, and when the electronic device 100 is in the expanded mode, the camera 60 is located in the middle of the entire flexible display screen 31.

The cover body 50 is detachably connected with the third portion 15, such that it is convenient to detach the cover body 50 to repair and replace the electrical components such as the mainboard 101, the battery 102 or the sensor stacked in the receiving chamber 150.

In addition, the cover body 50 is provided with a light transmitting part 56 corresponding to the camera 60, and the camera 60 can shoot through the light transmitting part 56. In this way, the camera 60 can be protected without affecting a shooting effect of the camera 60, so as to prevent the camera 60 from being accidentally scratched due to being directly exposed out of the housing 10.

As illustrated in FIGS. 23, 25 and 26, in this embodiment, the cover body 50 includes a first connecting part 51, a second connecting part 53 and a third connecting part 55, the first connecting part 51 is fixedly or detachably connected with the first portion 11 and encloses the first storage chamber 110, the second connecting part 53 is fixedly or detachably connected with the second portion 13 and encloses the second storage chamber 130, and the third connecting part 55 is fixedly or detachably connected with the third portion 15 and encloses the receiving chamber 150.

As illustrated in FIG. 23, when the electronic device 100 is in the narrow screen mode, that is, when the first portion 11 and the second portion 13 move towards each other to the limit position and are fully fitted with the third portion 15, the first connecting part 51, the second connecting part 53 and the third connecting part 55 are spliced together to form the cover body 50 of the electronic device 100. As illustrated in FIGS. 23, 24 and 26, in this embodiment, the first connecting part 51 and the second connecting part 53 are symmetrical with respect to the third connecting part 55. The first connecting part 51 and the second connecting part 53 include a convex arc portion, and two sides of the third connecting part 55 include a concave arc matching with the convex arc. When the electronic device 100 is in the narrow screen mode, the concave arc portion and the convex arc portion are spliced together to achieve the splicing of the first connecting part 51 and the third connecting part 55 and the splicing of the second connecting part 53 and the third connecting part 55. It may be understood that, the first connecting part 51, the second connecting part 53 and the third connecting part 55 may also be made into other forms. For example, all the three have a rectangular shape, and are directly spliced into the cover body 50. For another example, the two symmetrical sides of the third connecting part 55 are provided protrusions regularly arranged thereon, and the first connecting part 51 and the second connecting part 53 have grooves corresponding to the protrusions, such that when the electronic device 100 is in the expanded mode, the form of the housing 10 can be enriched to improve the aesthetic perception.

Further, in this embodiment, the first connecting part 52, the second connecting part 53, and the third connecting part 55 may be designed to have various different colors, thus enriching the appearance of the electronic device 100.

In this embodiment, two driving mechanisms (not illustrated) are provided, and the two driving mechanisms are arranged in the first storage chamber 110 and the second storage chamber 130, respectively. The driving mechanism arranged in the first storage chamber 110 is connected with the first top plate 111 and the first reel 21, and configured to drive the first portion 11 to move away from the third portion 15, and also to drive the first reel 21 to rotate to release the one end of the flexible display screen assembly 30.

The driving mechanism arranged in the second storage chamber 130 is connected with the second top plate 131 and the second reel 23, and configured to drive the second portion 13 to move away from the third portion 15, and also to drive the second reel 23 to rotate to release the other end of the flexible display screen assembly 30.

In this embodiment, the specific structure of the driving mechanism may be substantially consistent with that of the driving mechanism 70 in the above embodiment, for example, as illustrated in FIG. 5 and FIG. 7, which will not be described in detail herein to avoid redundancy.

In this embodiment, when the display region of the electronic device 100 needs to be expanded, that is, when the display portion 301 of the flexible display screen assembly 30 needs to be expanded, the first portion 11 may be driven to move away from the third portion 15 and the second portion 13 by the driving mechanism arranged in the first storage chamber 110. Moreover, the driving mechanism also drives the first reel 21 to rotate, such that the first reel 21 gradually releases the flexible display screen assembly 30, thus achieving the purpose of expanding the display portion 301 of the flexible display screen assembly 30 (for example, moving from the state illustrated in FIG. 26 to the state illustrated in FIG. 27).

When the display portion 301 of the flexible display screen assembly 30 needs to be narrowed, the motor 71 of the driving mechanism only needs to be rotated reversely, so as to drive the first portion 11 to move towards the third portion 15. In such a case, the first reel 21 is also rotated reversely under the drive of the driving mechanism, so as to gradually wind the end of the flexible display screen assembly 30 (for example, moving from the state illustrated in FIG. 27 to the state illustrated in FIG. 26).

It may be understood that, in this embodiment, a displacement of a movement of the first portion 11 is equal to a length of the flexible display screen assembly 30 released by the rotation of the first reel 21 in a unit time. In other words, a distance moved by the first portion 11 just is the length of the flexible display screen assembly 30 released by the rotation of the first reel 21, so as to ensure that the flexible display screen assembly 30 can move stably without wrinkles.

Similarly, when the display region of the electronic device 100 needs to be expanded, the second portion 13 may also be driven to move away from the third portion 15 and the first portion 11 by the driving mechanism arranged in the second storage chamber 130, and the driving mechanism also drives the second reel 23 to rotate, such that the second reel 23 can gradually release the flexible display screen assembly 30, thereby achieving the purpose of expanding the display portion 301 of the flexible display screen assembly 30.

It may be understood that, in this embodiment, when the display portion 301 of the flexible display screen assembly 30 needs to be expanded, only one of the two driving mechanisms may be used to drive the first portion 11 or the second portion 13 to move away from the third portion 15, so as to achieve the purpose of expanding the flexible display screen assembly 30. Certainly, the two driving mechanisms may be both used to drive the first portion 11 and the second portion 13 to move away from the third portion 15, respectively, so as to achieve the same purpose. In this embodiment, the two driving mechanisms are used to synchronously drive the first portion 11 and the second portion 13 to move away from the third portion 15, so as to achieve the expansion of the display portion 301 of the flexible display screen assembly 30.

The working principle of the electronic device 100 of this embodiment will be introduced below by taking an example that the two driving mechanisms drive the first portion 11 and the second portion 13 to move simultaneously.

As illustrated in FIGS. 22, 23, 26 and 27, as mentioned above, the electronic device 100 can switch between the narrow screen mode and the expanded mode. In the state illustrated in FIGS. 22 and 26, the electronic device 100 is in the narrow screen mode, and in the state illustrated in FIGS. 24 and 27, the electronic device 100 is in the expanded mode. In the narrow screen mode, the first portion 11, the second portion 13 and the third portion 15 are fitted together to form the housing 10. The one end of the flexible display screen assembly 30 is wound on the first reel 21 and the other end thereof is wound on the second reel 23. In this case, only a small part of the flexible display screen assembly 30 is exposed out of the housing 10, and the display portion 301 is narrow, such that it is convenient for the user to carry the electronic device 100.

When the user needs a large display portion 301, the first portion 11 and the second portion 13 are driven by the two mechanisms to move away from the third portion 15, respectively, and movement directions of the first portion 11 and the second portion 13 are opposite. At the same time, the driving mechanisms also drive the first reel 21 and the second rotating shaft 23 to rotate to release the flexible display screen assembly 30, such that the second region 311 of the flexible display screen 31 hidden in the first storage chamber 110 is gradually pulled out, and similarly, the third region 313 of the flexible display screen 31 hidden in the second storage chamber 130 is gradually pulled out. In this way, an area of a part of the flexible display screen assembly 30 exposed from the housing 10 is increased, so as to achieve the purpose of expanding the display portion 301 of the flexible display screen assembly 30. The area of the display portion 301 is relatively large, thus facilitating the user's operations and improving the user's operation experiences.

When the electronic device 100 needs to switch from the expanded mode to the narrow screen mode, the motor 71 of the driving mechanism only needs to be rotated reversely to drive the first portion 11 and the second portion 13 to move towards the third portion 15, respectively. In this case, the first reel 21 and the second reel 23 is also reversely rotated accordingly, and synchronously winds the flexible display screen assembly 30. When the first portion 11 and the second portion 13 move towards the third portion 15 to the limit position (that is, the three are fully fitted together), the motor 71 stops operating, and the electronic device 100 returns to the narrow screen mode.

In summary, the electronic device 100 according to the embodiment of the present disclosure includes the housing 10, the reel 20 and the flexible display screen assembly 30. The housing 10 includes the first portion 11 and the second portion 13 configured to move relative to each other. The reel 20 is rotatably arranged to the first portion 11. The one end of the flexible display screen assembly 30 is fixedly connected to the second portion 13, and the other end thereof is wound on the reel 20. The reel 20 can rotate to release the flexible display screen assembly 30 when the first portion 11 and the second portion 13 move away from each other, thereby expanding the display portion 301 of the flexible display screen assembly 30.

To sum up, in the electronic device 100 according to the embodiment of the present disclosure, when the first portion 11 and the second portion 13 of the housing 10 move away from each other, the reel 20 can rotate to release the flexible display screen assembly 30, thereby expanding the display portion 301 of the flexible display screen assembly 30. In this way, the size of the screen display region of the electronic device 100 can be freely adjusted. When a large screen is needed, the display portion 301 of the flexible display screen assembly 30 can be expanded to improve the user's operation experiences. When the large screen is not needed, the display portion 301 may not be expanded, such that the overall size of the electronic device 100 is small and it is easy to carry the electronic device 100.

Reference throughout this specification to "some certain embodiments", "an embodiment", "some embodiments", "an example embodiment", "an example", "a specific example", or "some examples" means that a particular feature, structure, material, or characteristic described in connection with the embodiment or example is included in at least one embodiment or example of the present application. In this specification, example descriptions of aforesaid terms are not necessarily as illustrated in the same embodiment or example. Furthermore, the particular features, structures, materials, or characteristics may be combined in any suitable manner in one or more embodiments or examples.

Although embodiments of present disclosure have been illustrated and described above, it may be understood that above embodiments are just explanatory, and cannot be construed to limit the present disclosure, for those skilled in the art, changes, alternatives, and modifications can be made to the embodiments without departing from the scope of the present disclosure.

What is claimed is:

1. An electronic device, comprising:
  a housing comprising a first portion and a second portion configured to move relative to each other, wherein the first portion defines an accommodating chamber therein;

a reel rotatably arranged to the first portion, wherein the reel is arranged in the accommodating chamber;

a flexible display screen assembly having an end connected to the second portion and another end coupled to the reel, wherein the reel is configured to rotate to release the flexible display screen assembly when the first portion and the second portion move away from each other, and wherein a part of the flexible display screen is arranged in the accommodating chamber; and a cover body comprising a first connecting part and a second connecting part movable relative to the first connecting part, wherein the cover body is connected with the first portion and covers the accommodating chamber, wherein the first connecting part is fixedly connected with the first portion, and wherein the second connecting part is fixedly connected with the second portion, wherein a display portion of the flexible display screen assembly is configured to be expanded when the first portion and the second portion move away from each other, and wherein the expanded display portion of the flexible display screen assembly is configured to be received in the accommodating chamber when the first portion and the second portion move towards each other.

2. The electronic device according to claim 1, wherein the reel is further configured to rotate to wind the flexible display screen assembly when the first portion and the second portion move towards each other.

3. The electronic device according to claim 1, further comprising a driving mechanism, wherein the driving mechanism is connected with the second portion and configured to drive the second portion to move away from the first portion to drive the flexible display screen assembly to move.

4. The electronic device according to claim 3, wherein the driving mechanism comprises a motor and a first transmission structure connected with the motor and the second portion, and the motor is configured to drive the second portion to move relative to the first portion by the first transmission structure.

5. The electronic device according to claim 4, wherein the first transmission structure comprises:
a first transmission gear connected with the motor; and
a rack part fixed to the second portion and meshed with the first transmission gear.

6. The electronic device according to claim 5, wherein the driving mechanism comprises a second transmission structure connected with the reel and the first transmission gear, and the motor is configured to drive the reel to rotate to release the flexible display screen assembly through the second transmission structure while driving the second portion to move away from the first portion.

7. The electronic device according to claim 6, wherein the second transmission structure comprises:
a second transmission gear fixed to the reel and concentric with the reel; and
a third transmission gear rotatably arranged to the first portion, and meshed with the second transmission gear and the first transmission gear.

8. The electronic device according to claim 1, wherein the flexible display screen assembly comprises a flexible display screen and a flexible support stacked and fixedly connected with the flexible display screen, the flexible support is connected with the reel, and the flexible support abuts against the first portion to keep the flexible display screen flat when the first portion and the second portion move away from each other.

9. The electronic device according to claim 8, wherein the first portion comprises a first top plate, and the flexible support is configured to be arranged between the flexible display screen and the first top plate to fill a gap between the flexible display screen and the first top plate when the first portion and the second portion move away from each other.

10. The electronic device according to claim 9, wherein the second portion comprises a second top plate attached on the first top plate and arranged between the flexible display screen and the first top plate.

11. The electronic device according to claim 10, wherein the flexible display screen comprises:
a first region fixed on the second top plate and overlapping the second top plate; and
a second region connected to the first region and at least partially arranged in the first portion.

12. The electronic device according to claim 11, wherein the flexible support is arranged to a bottom of the second region and exceeds beyond the second region, and an exceeding portion of the flexible support is connected to the reel.

13. The electronic device according to claim 1, further comprising a position limiting structure, wherein the position limiting structure is arranged to the housing and configured to prevent the reel from rotating when the second portion moves to a predetermined position relative to the first portion.

14. The electronic device according to claim 13, wherein the position limiting structure comprises:
a position limiting block provided to one of the first portion and the second portion; and
a position limiting groove formed in the other one of the first portion and the second portion,
wherein the position limiting block is configured to be engaged in the position limiting groove when the second portion moves to the predetermined position relative to the first portion.

15. The electronic device according to claim 1, further comprising a camera arranged in the accommodating chamber of the first portion,
the cover body comprises a light transmitting part corresponding to the camera, and the camera is configured to acquire images through light transmitting part.

16. An electronic device, comprising:
a housing comprising a first portion and a second portion connected to each other and slidable relative to each other;
a reel arranged in the first portion;
a flexible display screen assembly having a first end fixed to the second portion and a second end coupled to the reel, wherein the electronic device has a narrow screen mode in which a part of the flexible display screen assembly is wound on the reel, and an expanded mode in which the part of the flexible display screen assembly is exposed between the first portion and the second portion; and
a position limiting structure arranged to the housing and configured to prevent the reel from rotating when the second portion moves to a predetermined position relative to the first portion, wherein the position limiting structure comprises a position limiting block provided to one of the first portion and the second portion and a position limiting groove formed in the other one of the first portion and the second portion, wherein the position limiting block is configured to be engaged in the position limiting groove when the second portion moves to the predetermined position relative to the first portion.

17. The electronic device according to claim 16, wherein the reel is configured to rotate in a first direction to wind the part of the flexible display screen assembly when the first portion and the second portion move towards each other, and to rotate in a second direction to release the part of the flexible display screen assembly when the first portion and the second portion move away from each other, in which the second direction is opposite to the first direction.

18. An electronic device, comprising:
a housing comprising a first portion, a second portion, and a third portion, the first portion and the second portion being arranged to both sides of the third portion, respectively, and the first portion and the second portion being configured to move relative to the third portion;
a first reel arranged in the first portion and a second reel arranged in the second portion;
a flexible display screen assembly having a first end wound on the first reel and a second end wound on the second reel, wherein at least corresponding one of the first reel and the second reel arranged in at least one of the first portion and the second portion is configured to rotate to release the flexible display screen assembly when the at least one of the first portion and the second portion moves away from the third portion; and
a driving mechanism connected with the at least one of the first portion and the second portion and configured to drive the at least one of the first portion and the second portion to move away from the third portion to drive the flexible display screen assembly to move, wherein the driving mechanism comprises a motor and a first transmission structure connected with the motor and the at least one of the first portion and the second portion, and wherein the motor is configured to drive the at least one of the first portion and the second portion to move relative to the third portion by the first transmission structure,
wherein the first transmission structure comprises a first transmission gear connected with the motor and a rack part fixed to the at least one of the first portion and the second portion and meshed with the first transmission gear,
wherein the driving mechanism comprises a second transmission structure connected with the at least corresponding one of the first reel and the second reel and the first transmission gear, and wherein the motor is configured to drive the at least corresponding one of the first reel and the second reel to rotate to release the flexible display screen assembly through the second transmission structure while driving the at least one of the first portion and the second portion to move away from the third portion,
wherein the second transmission structure comprises a second transmission gear fixed to the at least corresponding one of the first reel and the second reel and concentric with the at least corresponding one of the first reel and the second reel and a third transmission gear rotatably arranged to the third portion and meshed with the second transmission gear and the first transmission gear.

* * * * *